(12) United States Patent
Bindley et al.

(10) Patent No.: US 12,358,735 B2
(45) Date of Patent: Jul. 15, 2025

(54) RADIATION DETECTOR UNIT WITH THREE-SIDE BUTTABLE READ-OUT INTEGRATED CIRCUIT AND METHOD OF MAKING THEREOF

(71) Applicant: REDLEN TECHNOLOGIES, INC., Saanichton (CA)

(72) Inventors: Glenn Bindley, Vancouver (CA); Krzysztof Iniewski, Port Moody (CA); Michael Ayukawa, Victoria (CA); James Fujimoto, Saanichton (CA)

(73) Assignee: REDLEN TECHNOLOGIES, INC., Saanichton (CA)

( * ) Notice: Subject to any disclaimer, the term of this patent is extended or adjusted under 35 U.S.C. 154(b) by 344 days.

(21) Appl. No.: 18/158,695

(22) Filed: Jan. 24, 2023

(65) Prior Publication Data

US 2023/0243985 A1    Aug. 3, 2023

Related U.S. Application Data

(60) Provisional application No. 63/304,805, filed on Jan. 31, 2022.

(51) Int. Cl.
*G01N 23/046* (2018.01)
*B65G 47/14* (2006.01)
(Continued)

(52) U.S. Cl.
CPC ....... *B65G 47/905* (2013.01); *B65G 47/1492* (2013.01); *B65G 47/18* (2013.01);
(Continued)

(58) Field of Classification Search
CPC ......... G01T 1/247; G01T 1/243; G01T 1/241; G01T 1/2928; G01T 1/20188; G01T 7/00;
(Continued)

(56) References Cited

U.S. PATENT DOCUMENTS 6,990,176 B2   1/2006   Sherman et al.
8,120,683 B1   2/2012   Tumer et al.
(Continued)

FOREIGN PATENT DOCUMENTS

JP       4934826 B2        5/2012
WO   WO2013/050229 A1   4/2013

OTHER PUBLICATIONS

European Patent Office Communication, Extended European Search Report for EP Application No. 22157726.5, mailed Jul. 25, 2022, 23 pages.
(Continued)

*Primary Examiner* — Irakli Kiknadze
(74) *Attorney, Agent, or Firm* — THE MARBURY LAW GROUP PLLC

(57) ABSTRACT

A radiation detector unit includes a read-out integrated circuit (ROIC) including a plurality of core circuit blocks located on a continuous uninterrupted substrate adjacent to one another along a first direction, and a plurality of radiation sensors bonded to a front side surface of the ROIC, where each radiation sensor of the plurality of radiation sensors is bonded to a respective core circuit block of the plurality of core circuit blocks of the ROIC. Additional embodiments include detector modules and detector arrays formed by assembling the detector units, and methods of operating and manufacturing the same.

18 Claims, 10 Drawing Sheets

(51) Int. Cl.
*B65G 47/18* (2006.01)
*B65G 47/88* (2006.01)
*B65G 47/90* (2006.01)
*G01N 23/083* (2018.01)
*G01T 1/24* (2006.01)

(52) U.S. Cl.
CPC ....... *B65G 47/8892* (2013.01); *G01N 23/046* (2013.01); *G01N 23/083* (2013.01); *G01T 1/247* (2013.01); *B65G 2203/0225* (2013.01); *B65G 2203/0241* (2013.01); *B65G 2203/025* (2013.01); *B65G 2203/041* (2013.01); *B65G 2203/042* (2013.01); *G01N 2223/04* (2013.01); *G01N 2223/401* (2013.01); *G01N 2223/419* (2013.01); *G01N 2223/50* (2013.01)

(58) Field of Classification Search
CPC ........... G01T 1/00; G01T 1/244; G01T 1/175; G01T 1/20184; G01T 1/17; G01T 1/20189; G01T 1/24; B65G 47/905; G01N 23/083; G01N 23/046; G01N 2223/501; G01N 2223/04; G01N 2223/419; G01N 2223/30; G01N 23/04; G01N 2223/401; A61B 6/4266; A61B 6/44; A61B 6/4291; A61B 6/032; A61B 6/4258; A61B 6/4283; A61B 6/4208; A61B 6/566; A61B 6/56; A61B 6/4464; A61B 6/4233; A61B 6/102; A61B 6/4441; A61B 6/4452; A61B 6/465; A61B 6/461; A61B 6/542; A61B 6/405; A61B 6/544; A61B 6/482; A61B 6/54; A61B 6/0407; A61B 6/469; A61B 6/5205; A61B 6/502; A61B 6/40; H01L 27/14623; H01L 27/14661; H01L 27/14663; H01L 27/14685; H01L 27/1469; H05G 1/64; H02J 7/00; H02J 7/00034; H02J 50/12; H02J 50/10; H02J 50/80; H02J 2310/23; G06T 5/00; G06T 3/40; G06T 7/13; G06T 2207/10116; G06T 11/005; G06T 5/73; G06T 5/70; G06T 7/155; G06T 7/12; H04B 5/26; H04B 5/79; H04B 5/77
USPC ...................................... 378/4, 19, 62, 98.8
See application file for complete search history.

(56) References Cited

U.S. PATENT DOCUMENTS

| | | |
|---|---|---|
| 9,202,961 B2 | 12/2015 | Chen et al. |
| 10,396,109 B2 | 8/2019 | Iniewski et al. |
| 11,067,707 B2 | 7/2021 | Crestani et al. |
| 2016/0377743 A1* | 12/2016 | Lee ............ G01T 1/24 250/370.06 |
| 2016/0377749 A1* | 12/2016 | Matsushita ............ G01T 7/005 378/207 |
| 2018/0014800 A1* | 1/2018 | Jang ..................... A61B 6/4441 |
| 2018/0220988 A1* | 8/2018 | Jeon .................... G01T 1/20188 |
| 2019/0114746 A1* | 4/2019 | Sakumura ................. G06T 5/00 |
| 2019/0339402 A1 | 11/2019 | Crestani et al. |
| 2021/0285897 A1 | 9/2021 | Read et al. |
| 2022/0045118 A1 | 2/2022 | Kumar et al. |
| 2023/0175989 A1* | 6/2023 | Simon ............. G01N 23/20008 378/4 |
| 2023/0393291 A1* | 12/2023 | Kindt ....................... G01T 1/18 |

OTHER PUBLICATIONS

Goderer, E. et al., "A Four-Side-Buttable Photon Counting ASIC for Computed Tomography," 5th Workshop on Medical Applications of Spectroscopic X-Ray Detectors, SIEMENS Healthineers, (May 2019), 30 pages.
https://harvestimaging.com/blog/?p=1599, (Sep. 8, 2016), 17 pages.
Jerram, P. et al., "Teledyne's High Performance Infrared Detectors for Space Missions," Proceedings vol. 11180, International Conference on Space Optics—ICSO 2018; 111803D (2019) https://doi.org/10.1117/12.2536040.
Rajendran, K. et al., "Full field-of-view, high-resolution, photon-counting detector CT: technical assessment and initial patient experience," Phys Med Biol, vol. 66, No. 20, 10.1088/1361-6560/ac155e, Oct. 27, 2021; doi: 10.1088/1361-6560/ac155e.

* cited by examiner

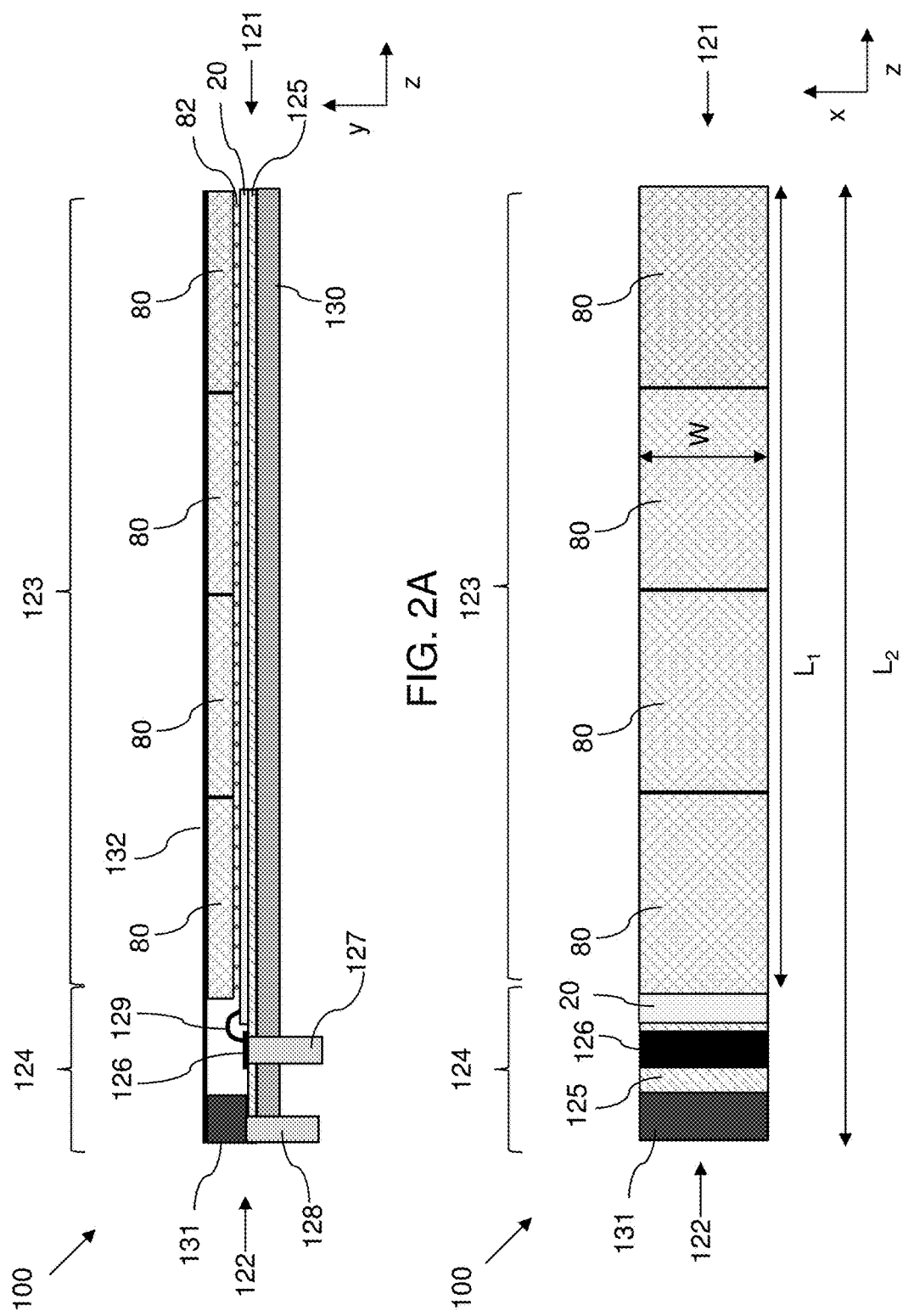

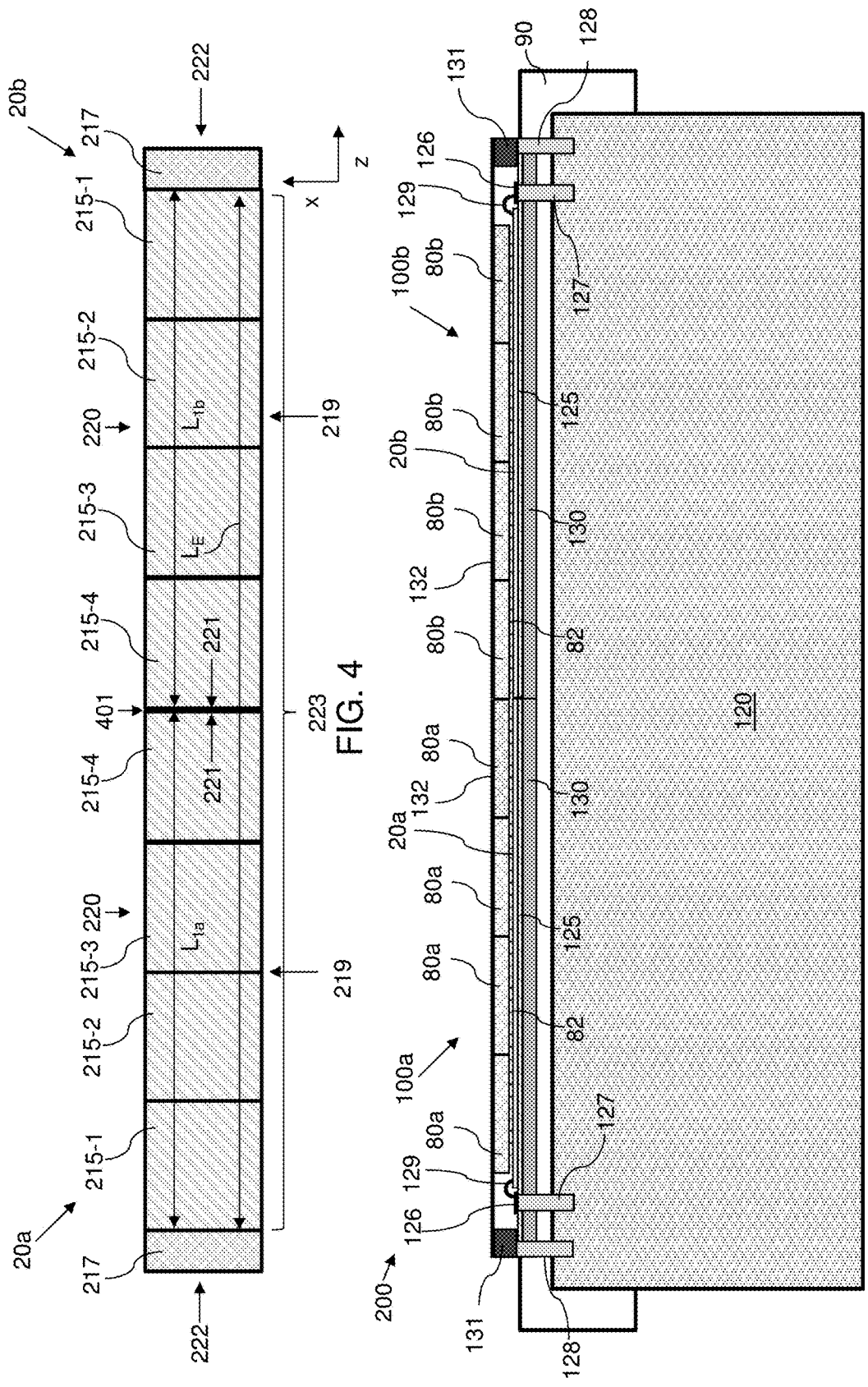

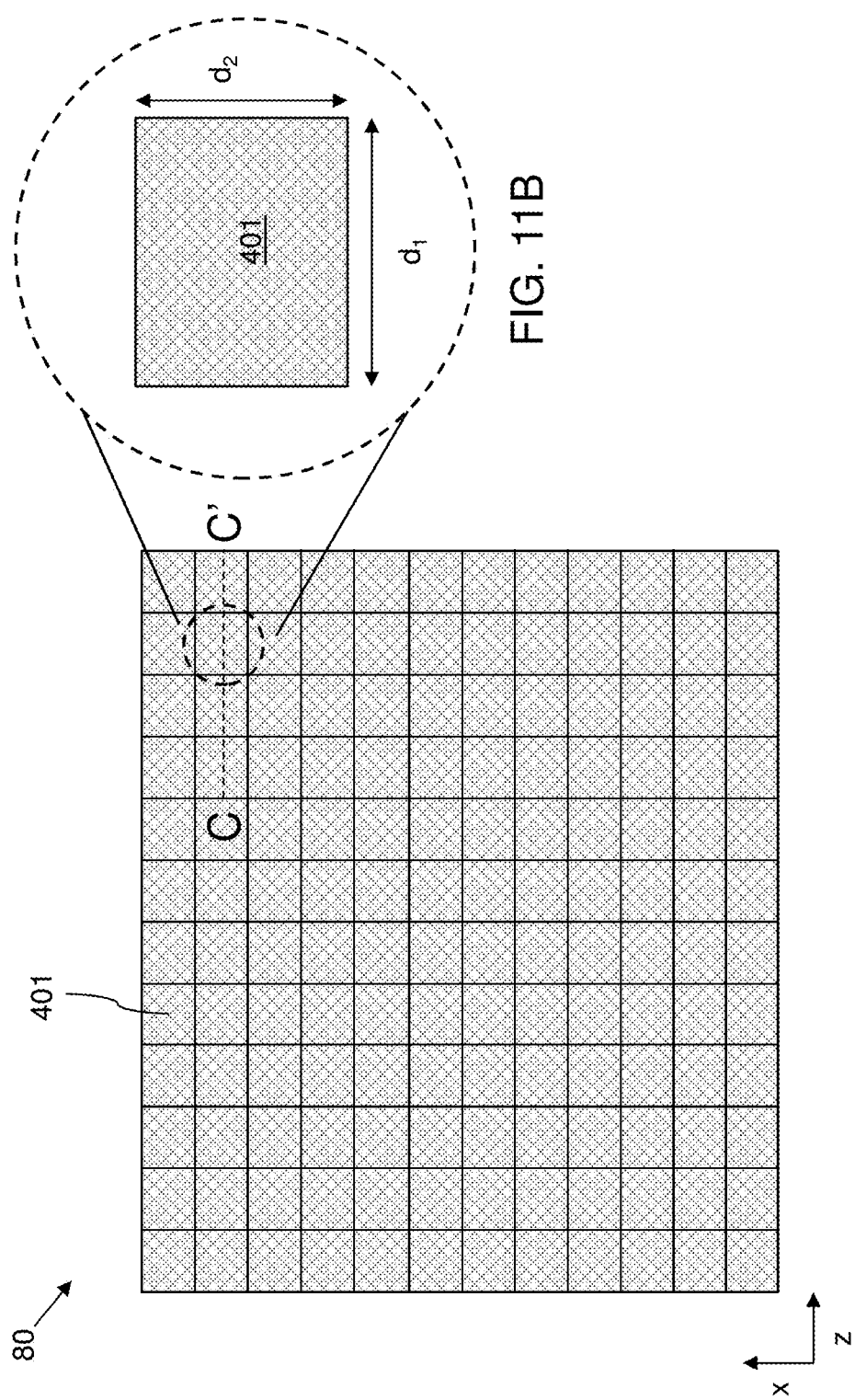

RADIATION DETECTOR UNIT WITH THREE-SIDE BUTTABLE READ-OUT INTEGRATED CIRCUIT AND METHOD OF MAKING THEREOF

FIELD

The present invention relates generally to radiation detectors, and more specifically to X-ray radiation detector units, detector modules and detector arrays, and methods of manufacturing the same.

BACKGROUND

Room temperature pixelated radiation detectors made of semiconductors, such as cadmium zinc telluride ($Cd_{1-x}Zn_xTe$ where $0<x<1$, or "CZT"), are gaining popularity for use in medical and non-medical imaging. These applications use the high energy resolution and sensitivity of the radiation detectors.

SUMMARY

According to an aspect of the present disclosure, a radiation detector unit includes a read-out integrated circuit (ROIC) including a plurality of core circuit blocks located on a continuous uninterrupted substrate adjacent to one another along a first direction, and a plurality of radiation sensors bonded to a front side surface of the ROIC, where each radiation sensor of the plurality of radiation sensors is bonded to a respective core circuit block of the plurality of core circuit blocks of the ROIC.

According to another aspect of the present disclosure, a detector module includes a first radiation detector unit including a first read-out integrated circuit (ROIC) including a plurality of core circuit blocks adjacent to one another along a first direction, and a first plurality of radiation sensors bonded to a front side surface of the first ROIC, where each radiation sensor of the first plurality of radiation sensors is bonded to a respective core circuit block of the plurality of core circuit blocks of the first ROIC, a second radiation detector unit including a second read-out integrated circuit (ROIC) including a plurality of core circuit blocks adjacent to one another along the first direction, and a second plurality of radiation sensors bonded to a front side surface of the second ROIC, where each radiation sensor of the second plurality of radiation sensors is bonded to a respective core circuit block of the plurality of core circuit blocks of the second ROIC, and a support member, where the first radiation detector unit and the second radiation detector unit are arranged on the support member such that a first peripheral edge of the first radiation detector unit abuts a first peripheral edge of the second radiation detector unit along the first direction and the first plurality of radiation sensors and the second plurality of radiation sensors form a continuous detector surface having a length of at least 8 cm along the first direction.

According to still another aspect of the present disclosure, a method of forming a radiation detector unit includes forming a read-out integrated circuit (ROIC) on a continuous uninterrupted semiconductor material substrate using photolithographic stitching, the ROIC including a peripheral circuit block and a plurality of core circuit blocks extending adjacent to one another along a first direction, and bonding a radiation sensor onto each of the core circuit blocks of the ROIC.

According to still another aspect of the present disclosure, a radiation sensor comprises a semiconductor material having first and second major surfaces, a plurality of anode electrodes located on the first major surface, and a cathode electrode located on the second major surface. A respective area of the semiconductor material below each of the anode electrodes comprises a pixel sensor, and a first dimension of each of the pixel sensors in a first direction in a plane of the first major surface is at least 25% larger than a second dimension in a perpendicular second direction in the plane of the first major surface.

According to yet another aspect of the present disclosure, a radiation detector unit comprises a read-out integrated circuit (ROIC) comprising identical first, second and third core circuit blocks located adjacent to one another along a first direction and containing an identical number and layout of input data channels and output data channels, and first, second and third radiation sensors bonded to the first, second and third second core circuit blocks respectively. The method operating the unit comprises generating first photon count data in the first core circuit block based on X-ray photons received by the first radiation sensor, transmitting the first photon count data from the first core circuit block to the second core circuit block via a first active output data channel of the output data channels of the first core circuit block, while at least one first dummy output data channel of the output data channels of the first core circuit block does not transmit photon count data to the second circuit block, generating second photon count data in the second core circuit block based on X-ray photons received by the second radiation sensor, and transmitting the first and the second photon count data from the second core circuit block to the third core circuit block via respective first and second active output data channels of the output data channels of the second core circuit block, while at least one second dummy output data channel of the output data channels of the second core circuit block does not transmit photon count data to the third circuit block.

According to another aspect of the present disclosure, a radiation detector unit comprises a read-out integrated circuit (ROIC) comprising a plurality of core circuit blocks located adjacent to one another along a first direction, a plurality of radiation sensors bonded to a front side surface of the ROIC, a local control unit comprising a local controller and a local memory storage component, wherein the local controller is configured to control operation of the ROIC and the local memory storage component. And a local processing unit configured to perform operations comprising at least one of data compression or buffering of digital detection signals generated by the core circuit blocks, providing updated temperature data, providing updated non-conforming pixel data, error correction, dynamic detection of bad pixels, minimodule neighbor recognition, or non-conforming pixel list re-configuration.

BRIEF DESCRIPTION OF THE DRAWINGS

FIG. 2A is a side view of the radiation detector unit according to an embodiment of the present disclosure.

FIG. 2B is a top view of the radiation detector unit of FIG. 2A according to an embodiment of the present disclosure.

FIG. 4 is a top view of a pair of ROICs that are butted against one another along the z-axis direction.

FIG. 5 is a side view of a detector module including a pair of buttable radiation detector units according to an embodiment of the present disclosure.

FIG. 11A schematically illustrates a top view of a radiation sensor according to an embodiment of the present disclosure.

FIG. 11B is an enlarged view of a portion of the radiation sensor of FIG. 11A showing a pixel sensor according to an embodiment of the present disclosure.

DETAILED DESCRIPTION

Embodiments of the present disclosure provide radiation detector units, detector modules and detector arrays formed by assembling the detector units, and methods of manufacturing the same, the various aspects of which are described herein with reference to the drawings.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims. Any reference to claim elements in the singular, for example, using the articles "a," "an," or "the" is not to be construed as limiting the element to the singular. The terms "example," "exemplary," or any term of the like are used herein to mean serving as an example, instance, or illustration. Any implementation described herein as an "example" is not necessarily to be construed as preferred or advantageous over another implementation. The drawings are not drawn to scale. Multiple instances of an element may be duplicated where a single instance of the element is illustrated, unless absence of duplication of elements is expressly described or clearly indicated otherwise.

In computed tomography (CT) imaging systems, a scanned object is exposed to an X-ray beam. Attenuated photons from the X-ray beam are detected by a detector array. When an object is loaded in a CT imaging system, the X-ray beam may be heavily attenuated, and the number of photons detected by the detector array may be orders of magnitude less than the number of photons emitted from an X-ray source. For image reconstruction purposes, the detector array can be exposed to a direct X-ray beam without an intervening object located inside the CT imaging system. In such cases, the photon count rates in the CT imaging system may reach values of 100 million counts per second per square millimeter (Mcps/mm$^2$) or more. The detector array is capable of detecting such a wide range of photon count rates.

Figure 1:
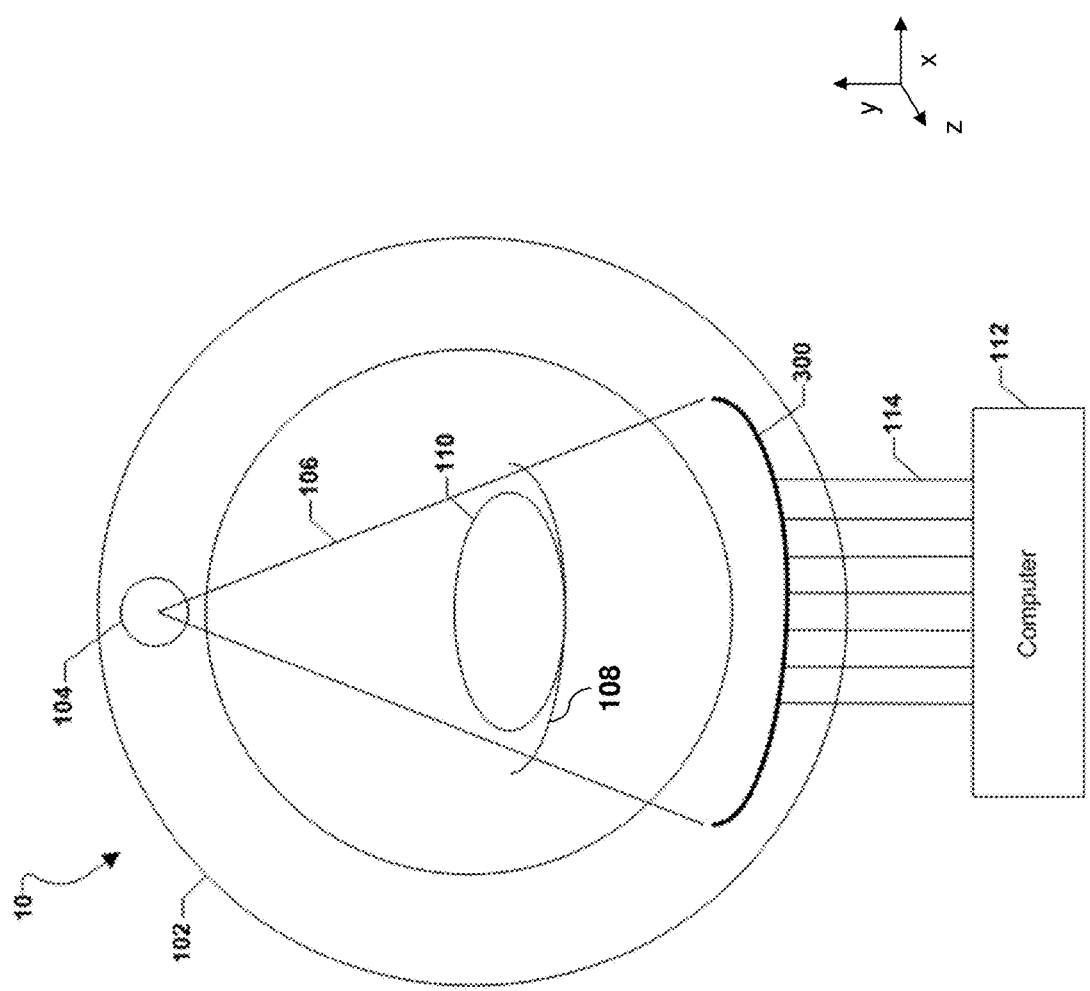
FIG. 1 is a functional block diagram of a computed tomography (CT) imaging system that can include radiation detector units according to an embodiment of the present disclosure.

FIG. 1 is a functional block diagram of a CT imaging system 10 according to various embodiments. The CT imaging system 10 may include a gantry 102, which may include a moving part, such as a circular, rotating frame with an X-ray source 104 mounted on one side and a curved detector array 300 mounted on the other side. The gantry 102 may also include a stationary (i.e., non-moving) part, such as a support, legs, mounting frame, etc., which rests on the floor and supports the moving part. The X-ray source 104 may emit a fan-shaped X-ray beam 106 as the gantry 102 and the X-ray source 104 rotates around a support 108 supporting an object 110 inside the CT imaging system 10. The object 110 may be any biological (e.g., human patient) or non-biological sample to be scanned. After the X-ray beam 106 is attenuated by the object 110, the X-ray beam 106 is received by the detector array 300. The curved shape of the detector array 300 allows the CT imaging system 10 to create a 360° continuous circular ring of the image of the object 110 by rotating the gantry 102 around the object 110.

For each complete rotation of the gantry 102, one cross-sectional slice of the object 110 is acquired. As the gantry 102 continues to rotate, the detector array 300 takes numerous snapshots called "views". Typically, about 1,000 profiles are taken in one rotation of the gantry 102. The object 110 may slowly pass through the rotating gantry 102 (e.g., by moving the support 108 in the z-direction perpendicular to the x-y plane of gantry 102) so that the detector array 300 captures incremental cross-sectional profiles of a region of interest of the object 110, which may include the entire object 110. Alternatively, the support 108 supporting the object 110 may remain stationary and the gantry 102 may be moved along the length of the object 110 as the gantry 102 is rotated. The data generated by the detector array 300 is passed to a computer 112 that is located remotely from the gantry 102 via a connection 114. The connection 114 may be any type of wired or wireless connection. If connection 114 is a wired connection, the connection 114 can include a slip ring electrical connection between the rotating part of the gantry 102 supporting the detector 300 and a stationary support part of the gantry 102 which supports the rotating part (e.g., the rotating ring). If the connection 114 comprises a wireless connection, then the detector 300 mounted on the rotating part of the gantry 102 may contain any suitable wireless transceiver to communicate data with another wireless transceiver that is not located on the rotating part of the gantry 102 and which is in communication with the computer 112. The computer 112 may include processing and imaging applications that analyze each profile obtained by the detector array 300, and the full set of profiles from each rotation may be compiled to provide a three-dimensional computed tomographic (CT) reconstruction of the regionof-interest of the object 110 and/or two-dimensional images of cross-sectional slices of the object 110.

Various alternatives to the design of the CT imaging system 10 of FIG. 1 may be employed to practice embodiments of the present disclosure. CT imaging systems may be designed in various architectures and configurations. For example, a CT imaging system may have a helical architecture. In a helical CT imaging scanner, the X-ray source and detector array are attached to a freely rotating gantry. During a scan, the object 110 may move relative to the rotating part of the gantry 102 while the rotating part of the gantry 102 rotates so that the X-ray beam follows a helical path around the object 110. For example, the support 108 (e.g., a table) may move the object 110 smoothly through the scanner to create a helical path traced out by the X-ray beam. Slip rings may be used to provide the transfer of power and data on and off the rotating gantry. A switched mode power supply may be used to power the X-ray source while at the same time still be small enough to be installed on the gantry.

In other embodiments, the CT imaging system may be a tomosynthesis CT imaging system. In a tomosynthesis CT scanner, the gantry may move in a limited rotation angle (e.g., between 15 degrees and 60 degrees) in order to detect a cross-sectional slice of the object. The tomosynthesis CT scanner may be able to acquire slices at different depths and with different thicknesses that may be reconstructed via image processing.

The detector array of a CT imaging system may include an array of radiation detector elements, such as pixel sensors. The signals from the pixel sensors may be processed by a pixel detector circuit, which may sort detected photons into energy bins based on the energy of each photon or the voltage generated by the received photon. When a photon is detected, its energy is determined and the photon count for its associated energy bin is incremented. For example, if the detected energy of a photon is 24 kilo-electron-volts (keV), the photon count for the energy bin of 20-40 keV may be incremented. The number of energy bins may range from one to several, such as two to six. In an illustrative example, a photon counting detector may have four energy bins: a first bin for detecting photons having an energy between 20 keV and 40 keV, a second bin for detecting photons having an energy between 40 keV and 60 keV, a third bin for detecting photons having an energy between 60 keV and 80 keV, and a fourth bin for detecting photons having an energy above 80 keV. The greater the total number of energy bins, the better the material discrimination.

The computed tomography (CT) imaging system 10 of the embodiments of present disclosure includes a detector array 300 (which is also known as a detector module system (DMS)). The detector array 300 may include a plurality of detector modules that are arranged in a piecewise curvilinear array such that surfaces of the detector modules conform to the surface of a cylindrical arc. These detector modules are constructed to minimize gaps between adjacent pairs of detector modules. A plurality of detector modules may be arranged adjacent to one another within the detector array 300 such that each module abuts at least one other module along a first horizontal direction (i.e., the x-axis direction in FIG. 1).

Each detector module may be constructed from a set of radiation detector units, which are also referred to as "minimodules" or "submodules." The radiation detector units of the embodiments of the present disclosure are designed to minimize gaps between adjacent pairs of radiation detector units. In some embodiments, each detector module may include a plurality of radiation detector units arranged adjacent to one another such that each radiation detector unit abuts another radiation detector unit of the detector module along a second horizontal direction that is perpendicular to the first horizontal direction (i.e., the z-axis direction, or into and out of the plane of FIG. 1). Thus, a detector array 300 may include a two-dimensional array of three-side buttable radiation detector units arranged within a curved cylindrical surface with minimal or no gaps between the radiation detector units.

FIGS. 2A and 2B are side and top views, respectively, of a radiation detector unit 100 according to an embodiment of the present disclosure. The radiation detector unit 100 of FIGS. 2A and 2B includes a special purpose semiconductor chip configured to receive electrical signals from at least one radiation sensor 80 as input signals and to generate output signals representing the detection location and the magnitude of the detection current for each detected event. The special purpose semiconductor chip is herein referred to as a read-out integrated circuit (ROIC) 20 that is customized for use in the radiation detector unit 100. The ROIC 20 may also be referred to as a read-out application-specific integrated circuit (ASIC). The ROIC 20 in various embodiments includes an arrangement of electronic signal sensing channels and supporting logic circuitry in at least one monolithic component. The ROIC 20 may include an arrangement of circuit elements located on and/or within a single supporting substrate, which may be a semiconductor material substrate (e.g., a silicon substrate). The ROIC 20 is configured to identify the pixel at which an event (i.e., impingement of radiation, e.g., X-ray radiation) is detected, to measure the electrical current induced by the event, and to provide digital signals representing the magnitude of the electrical signals (which can be generated by an analog-to-digital conversion (ADC) circuitry). The ROIC 20 may interface with external components through bonding pads that are located on the front side surface of the ROIC 20. As used herein, the "front side" of elements refers to the side that faces the incoming radiation, and the "backside" of elements refers to the side that is the opposite side of the front side. The bonding pads include input pads, output pads, and one or more power pads. Bonding pads of the ROIC 20 may be arranged as an array, such as a rectangular array.

At least one radiation sensor 80 may be mounted over the front side surface of the ROIC 20. FIGS. 2A and 2B illustrate an embodiment radiation detector unit 100 having four radiation sensors 80 mounted over the front side surface of the ROIC 20. It will be understood that a greater or lesser number of radiation sensors 80 may be mounted over the front side surface of the ROIC 20. For example, in various embodiments, between 2 and 8 (e.g., 3-5) radiation sensors 80 may be mounted over the front side surface of the ROIC 20. In embodiments including multiple radiation sensors 80, the plurality of radiation sensors 80 of the radiation detector unit 100 may abut one another along the z-axis direction. Accordingly, the plurality of radiation sensors 80 may provide a continuous radiation sensor area 123 extending along the z-axis direction. The continuous radiation sensor area 123 may extend to a first peripheral edge 121 of the radiation detector unit 100. The continuous radiation sensor area 123 may also extend across the entire width, W, of the radiation detector unit 100 along the x-axis direction, as shown in FIG. 2B. The radiation detector unit 100 may also include a peripheral area 124 that does not include any radiation sensors 80. The peripheral area 124 may be located between the continuous radiation sensor area 123 and a second peripheral edge 122 of the radiation detector unit 100 that is opposite the first peripheral edge 121. In various embodiments, a portion of the ROIC 20 may extend partway into the peripheral area 124 of the radiation detector unit 100 as shown in FIGS. 2A and 2B.

In various embodiments, the length dimension, $L_1$, of the continuous radiation sensor area 123 of the radiation detector unit 100 along the z-axis direction may be greater than about 2 cm, such as 4-40 cm, including 6-20 cm (e.g., 8-16 cm), although greater and lesser length dimensions of the radiation sensor area 123 are within the contemplated scope of disclosure. The overall length dimension, $L_2$, of the radiation detector unit 100 along the z-axis may be greater than about 3 cm, such as 5-45 cm, including between 9-20 cm, although greater and lesser length dimensions are within the contemplated scope of disclosure. The width dimension, W, of the radiation detector unit 100 along the x-axis may be at least about 1 cm, such as 1-4 cm, including between about 2 and about 3 cm, although greater and lesser width dimensions are within the contemplated scope of disclosure.

In various embodiments, the radiation sensors 80 may be bonded to the front side surface of the ROIC 20 via bonding material portions 82. The bonding material portions 82 may include a suitable bonding material for forming electrical and mechanical connections between the backside surfaces of the radiation sensors 80 and the front side surface of the ROIC 20. Suitable bonding materials for the bonding material portions 82 may include one or more of, without limitation, solder balls, conductive-material pillars, stacks or bumps, and/or a conductive epoxy. Other suitable bonding materials for the bonding material portions 82 are within the contemplated scope of disclosure. In some embodiments, the bonding material portions 82 may include an array of stud bumps formed of a conductive material (e.g., gold), and a conductive epoxy material over the stud bumps. The bonding material portions 82 may electrically couple the bonding pads on the front side surface of the ROIC 20 to a corresponding set of bonding pads located on the backside surface of each of the radiation sensors 80. In embodiments, the bonding pads on the front side surface of the ROIC 20 may have the same periodicity as the periodicity of the bonding pads located on the backside surface of the radiation sensors 80.

Electrical signals may be transmitted between the bonding pads on the radiation sensors 80 and the bonding pads on the ROIC 20 via the bonding material portions 82. In some embodiments, the radiation sensors 80 may include an array of pixel sensors. Each pixel sensor of the respective radiation sensors 80 may include at least one bonding pad that is electrically connected to a corresponding bonding pad of the ROIC 20. Event detection signals from individual pixel sensors of the radiation sensors 80 may be transmitted to pixel input channels of the ROIC 20 via the bonding material portions 82. The ROIC 20 may be configured to convert event detection signals from the pixel sensors of the radiation sensors 80 into digital detection signals, which can include the pixel location and the energy range of the detected radiation.

Referring again to FIGS. 2A and 2B, the ROIC 20 may be located on a carrier board 125. The carrier board 125 may include an electrically insulating matrix and may provide high thermal conductivity to function as an effective conduit for heat generated from the ROIC 20. In some embodiments, the carrier board 125 may be composed of a ceramic, glass, glass-ceramic, or laminate thereof material. The backside surface of the ROIC 20 may contact the front side surface of the carrier board 125. In some embodiments, an optional stiffening member 130 may be located on the backside of the carrier board 125 to provide increased mechanical support and stiffness to the radiation detector unit 100. The carrier board 125 and the optional stiffening member 130 may extend over the full length, $L_2$, of the radiation detector unit 100 between the first peripheral edge 121 and the second peripheral edge 122 of the radiation detector unit 100. The widths of the ROIC 20, the carrier board 125, and the optional stiffening member 130 along the x-axis direction may be substantially the same as the width dimensions of the radiation sensors 80.

At least one electrical connector 127, 128 may be electrically connected to the radiation detector unit 100. In the embodiment shown in FIG. 2A, a first electrical connector 127 may be electrically connected to a bond pad region 126 of the carrier board 125. At least one wire bond 129, which may be one or more reverse wire bonds, may electrically connect bond pads in the bond pad region 126 of the carrier board 125 with bond pads on the front side surface of the ROIC 20. The first electrical connector 127 and the wire bonds 129 may be configured to route power supply to the ROIC 20, control signals to the ROIC 20, and data signals generated by the ROIC 20. The first electrical connector 127 may carry relatively low voltage signals and power supply, including voltages less than about 10V. In some embodiments, the first electrical connector 127 may be a flex cable assembly that includes both power and signal wires. Other suitable electrical connectors are within the contemplated scope of disclosure. Furthermore, although a single first electrical connector 127 is shown in FIG. 2A, it will be understood that multiple first electrical connectors 127 may be connected to the carrier board 125.

The radiation detector unit 100 may also include a second electrical connector 128. The second electrical connector 128 may be a high voltage electrical connector that is used to selectively provide a bias voltage to the radiation sensors 80 (e.g., to the cathodes of the radiation sensors) of the radiation detector unit 100. In various embodiments, the second electrical connector 128 may provide a high voltage in excess of 500V, such as 750V to 1500V, including about 1000V. The high voltage electrical connector 128 may be electrically connected to an electrical filter assembly 131 that may be located on the front side surface of the carrier board 125. The electrical filter assembly 131 may include an RC filter that is configured to condition the voltage provided via the second electrical connector 128 to improve the stability of the bias voltage provided to the radiation sensors 80. As shown in FIG. 2A, a conductive member 132, which may comprise a metal foil sheet, may extend from the filter assembly 131 over the front side surfaces (e.g., cathodes) of the radiation sensors 80 to provide the bias voltage to the radiation sensors 80 (for purposes of clarity, the conductive member 132, first electrical connector 127, the second electrical connector 128 and the wire bonds 129 are omitted in FIG. 2B).

In some embodiments, one or more thermal vias (not shown in FIGS. 2A and 2B) may extend through the carrier board 125. The thermal vias may help to dissipate heat generated by the ROIC 20 and direct the heat away from the radiation sensors 80, which may be thermally-sensitive components. The thermal via may comprise a hole extending through the carrier 125. Optionally, the sidewalls of the hole may be coated with a high thermal conductivity material, such as a metal (e.g., copper), to form a hollow material (e.g., copper) shape (e.g., hollow cylinder) located in the hole.

In the radiation detector unit 100 shown in FIGS. 2A and 2B, the radiation sensors 80 may be directly mounted to the front side surface of the ROIC 20 via the bonding material portions 82, and no interposer or similar intervening structural component for routing of electrical signals between the radiation sensors 80 and the ROIC 20 is located between the backside surface of the radiation sensors 80 and the front side surface of the ROIC 20. For certain applications, providing an interposer between the radiation sensors 80 and the ROIC 20 to route electrical signals between these components may contribute significant capacitive load to the radiation detector unit 100. This may result in excessive power generation which can negatively affect the performance of the radiation detector unit 100, and may also effectively limit the size of the radiation detector unit 100. Accordingly, various embodiments include a radiation detector unit 100 in which one or more radiation sensors 80 are directly mounted on and electrically connected to the ROIC 20 without the use of an interposer. By directly mounting the radiation sensors 80 to the ROIC 20, in some embodiments, the power dissipation per channel of the detector system may be reduced by at least a factor of 2, such as by a factor of 3 or by a factor of 4 or more, as compared to an equivalent detector system that includes an interposer between the radiation sensors 80 and the ROIC 20.

In some embodiments, all electrical connections to the ROIC 20 are made via the front side surface of the ROIC 20. Thus, no conductive via structures, such as through-silicon vias (TSVs), may extend from the backside of the ROIC 20 through the semiconductor material substrate of the ROIC 20. This may reduce the complexity of the manufacturing process of the ROIC 20 and provide a significantly lower cost.

In alternative embodiments, at least some of the electrical connections to the ROIC 20 may be through the backside of the ROIC 20. In some embodiments, one or more electrical conductors, such as conductive traces, may extend along the length of radiation detector unit 100, such as over the backside surface of the carrier board 125. Via structures through the carrier board 125 and/or through the substrate of the ROIC 20 may electrically connect the conductors to the ROIC 20. In one non-limiting example, power supply (e.g., Vdd and Vss) to the ROIC 20 may be provided through the backside surface of the ROIC 20, and data connections to the ROIC 20 may be provided on the front side of the ROIC 20.

Figure 3A:
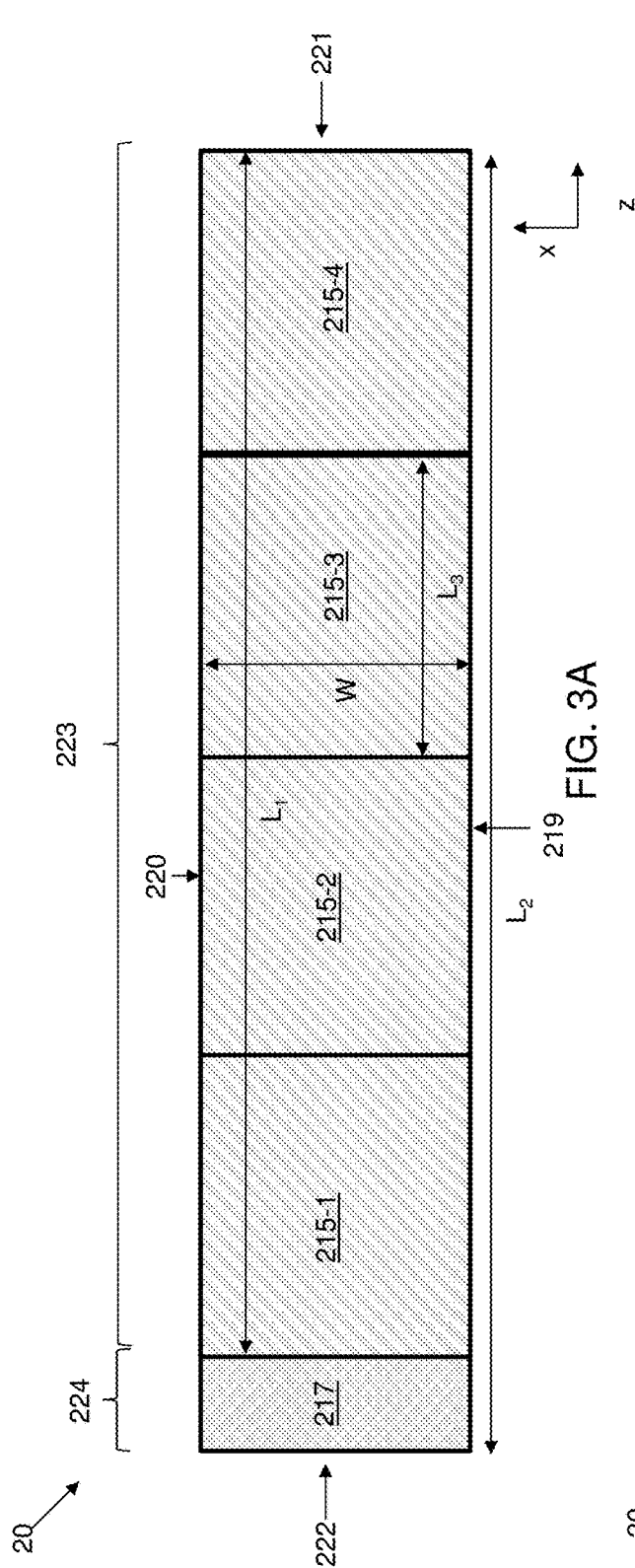
FIG. 3A is a schematic top view of the front side of a read-out integrated circuit (ROIC) according to an embodiment of the present disclosure.

FIG. 3A is a schematic plan view of the front side of the ROIC 20 according to an embodiment of the present disclosure. The ROIC 20 may include a first region 223 to which one or more radiation sensors 80 may be bonded, and a second region 224 adjacent to the first region 223 along the z-axis direction. In an assembled radiation detector unit 100, such as shown in FIGS. 2A and 2B, the first region 223 may be located in the continuous radiation sensor area 123 of the radiation detector unit 100, and the second region 224 may be located in the peripheral area 124 of the radiation detector unit 100. The ROIC 20 may be configured to be bonded to a single radiation sensor 80, a one-dimensional array of abutting radiation sensors 80 arranged along the z-axis, or a K×L matrix array of abutting radiation sensors 80 arranged along both the x- and z-axes in which K is an integer greater than 1 and L is an integer greater than 1. Each of the radiation sensors 80 may have a rectangular periphery. In embodiments in which multiple radiation sensors 80 are mounted to the ROIC 20, the ROIC 20 may have a rectangular outer periphery to provide an abutting configuration upon assembly of multiple radiation detector units 100 in a two-dimensional array.

The ROIC 20 in accordance with various embodiments may be buttable on at least two sides, and preferably on three sides of the ROIC 20. In particular, in an assembled two-dimensional detector array, such as a detector array 300 described above with reference to FIG. 1, peripheral side surfaces 219 and 220 of the ROIC 20 may be butted in the x-direction against corresponding peripheral side surfaces of ROICs of adjacent radiation detector units 100 of the detector array 300. In addition, in certain embodiments described in further detail below, peripheral side surface 221 of the ROIC 20 may be butted against a corresponding peripheral side surface of an adjacent radiation detector unit 100 of the detector array 300.

Dimensions of the ROIC 20 may generally correspond to the dimensions of the radiation sensor(s) 80 which are mounted to the front side surface of the ROIC 20 in the assembled radiation detector unit 100. In particular, the width dimension, W, of the ROIC 20 along the x-axis direction may be substantially equal (e.g., within ±4%, such as ±0-2%) to the width(s) of the radiation sensor(s) 80 mounted to the ROIC 20 along the x-axis direction. Similarly, the length dimension, $L_1$, of the first region 223 of the ROIC 20 along the z-axis direction may be substantially equal (e.g., within ±4%, such as ±0-2%) to the lengths(s) of the radiation sensor(s) 80 mounted to the ROIC 20 along the z-axis direction.

In general, the ROIC 20 according to various embodiments may include at least one core circuit block 215 in the first region 223 of the ROIC 20, and a peripheral circuit block 217 in the second region 224 of the ROIC 20. The peripheral circuit block 217 may be located adjacent to a peripheral side surface 222 of the ROIC 20 that is not butted against a peripheral side surface of an adjacent radiation detector unit 100 within a detector module 200 or a detector array 300. In the exemplary embodiment shown in FIGS. 3A and 3B, the ROIC 20 includes a peripheral circuit block 217 and four core circuit blocks 215-1, 215-2, 215-3 and 215-4 adjacent to one another along the z-axis direction. It will be understood that a ROIC 20 according to various embodiments may have a greater or lesser number of core circuit blocks 215, such as two to five core circuit blocks 215 for example. Each of the core circuit blocks 215-1, 215-2, 215-3 and 215-4 may have length and width dimensions, $L_3$ and W, that are substantially equal (e.g., within ±4%, such as ±0-2%) to the length and width dimensions of a radiation sensor 80 that is bonded to the front side surface of the ROIC 20. A radiation sensor 80 may be bonded to each of the core circuit blocks 215-1, 215-2, 215-3 and 215-4 of the ROIC 20 in the assembled radiation detector unit 100.

Each of the core circuit blocks 215-1, 215-2, 215-3 and 215-4 may include an array of bonding pads having the same number and layout of bonding pads as the number and layout of pixel sensors of the radiation sensor 80 that is bonded to the core circuit block 215-1, 215-2, 215-3 and 215-4 in the assembled radiation detector unit 100. Each bonding pad of the array of bonding pads on a core circuit block 215-1, 215-2, 215-3 and 215-4 may be electrically coupled to a pixel sensor of the radiation sensor 80 that is bonded to the core circuit block 215-1, 215-2, 215-3 and 215-4. Each of the core circuit blocks 215-1, 215-2, 215-3 and 215-4 may also include additional circuit elements, such as electronic signal sensing channels and supporting logic circuitry. In some embodiments, each of the core circuit block 215-1, 215-2, 215-3 and 215-4 of the ROIC 20 may include identical circuit elements in an identical layout as each of the other core circuit blocks 215-1, 215-2, 215-3 and 215-4 of the ROIC 20.

The peripheral circuit block 217 of the ROIC 20 may include input/output (I/O) circuitry for the ROIC 20, including, for example, output bond pads for transmitting digitized radiation event detection signals from the ROIC 20, input bond pads for receiving control signals for the ROIC 20, and power pads for providing electrical power to the ROIC 20.

Accordingly, the ROIC 20 according to various embodiments may have a cross sectional area in a plane parallel to the major surface of the ROIC 20 that is greater than the combined cross sectional areas of each of the radiation sensors 80 which are mounted to the ROIC 20. The ROIC 20 according to some embodiments may have a larger cross-section area than many equivalent read-out ASICs currently used in X-ray imaging systems. In various embodiments, the ROIC 20 may have at least one dimension (e.g., the length $L_2$ along the z-axis direction) that is greater than 4 cm, such as 8 cm or more (e.g., 8-16 cm).

Figure 3B:
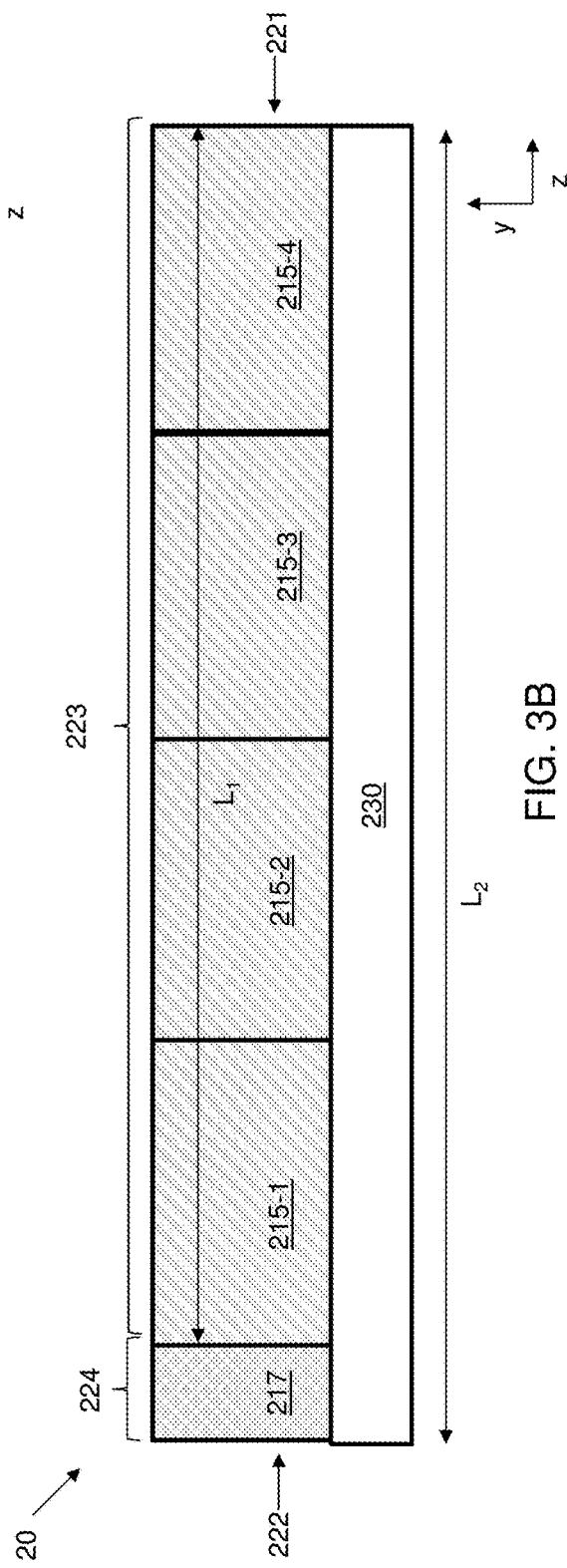
FIG. 3B is a schematic side view of the read-out integrated circuit (ROIC) of FIG. 3A according to an embodiment of the present disclosure.

In various embodiments, the ROIC 20 as described above may be fabricated using a photolithographic "stitching" process. "Stitching" is a semiconductor fabrication technique that enables fabrication of a monolithic integrated circuit (IC) device on a single semiconductor substrate (e.g., silicon wafer) 230 where the IC device is larger than the field-of-view of the lithographic equipment that is used to fabricate the IC device. Semiconductor integrated circuit (IC) devices, such as the ROIC 20 shown in FIG. 3B, are electronic devices containing a large number of functional components, such as transistors, interconnect structures (e.g., metal lines and vias), and the like, which are formed on the substrate 230, such as a semiconductor wafer, e.g., a silicon wafer. These functional components are typically formed layer-by-layer on the wafer 230 using a number of repeated processing steps, including material deposition processes, photolithographic patterning processes, and etching processes. The pattern and layout of the various circuit components may be defined using photolithographic processes, which may include coating the wafer with photoresist, projecting a desired circuit pattern onto the photoresist using a specialized photomask (also referred to as a "reticle"), and developing the photoresist to transfer the desired circuit pattern onto the wafer 230.

In practice, the effective field-of-view of the lithography equipment used to project the reticle pattern onto the photoresist may limit the size of the circuit pattern that can be transferred at one time. "Stitching" is a technique in which the photolithographic equipment is programmed to project sub-sections of a full circuit pattern onto adjacent areas of the wafer 230. The different sub-sections may be projected using the same reticle, using different portions of the same reticle, and/or using different reticles. In this way, the different sub-sections of the full circuit pattern may be effectively "stitched" together on the surface of the wafer. Accordingly, a continuous full circuit pattern having a larger size than the field-of-view of the photolithographic equipment may be transferred to the wafer 230. This process may be repeated as many times as necessary to fabricate the complete integrated circuit structure on the wafer, which may then be separated from the wafer to provide an individual IC chip, such as the ROIC 20 as described above.

Referring to FIGS. 3A and 3B, the ROIC 20 may be fabricated using a "stitching" process as described above in various embodiments of the present disclosure. In particular, a first set of one or more reticle masks may be used to transfer identical sub-sections of the full circuit pattern of the ROIC 20 to adjacent regions of a semiconductor wafer 230 along a first direction (i.e., the z-axis direction in FIGS. 3A and 3B) in order to form each of the core circuit blocks 215-1, 215-2, 215-3 and 215-4 of the ROIC 20. For example, a reticle mask including a first sub-section of the ROIC 20 circuit pattern may be projected onto an area of the wafer corresponding to core circuit block 215-1. The photolithographic equipment may then be moved relative to the wafer along the z-axis direction, and the reticle mask including the first sub-section of the ROIC 20 circuit pattern may be projected onto an adjacent area of the wafer 230 corresponding to core circuit block 215-2. This process may be repeated to transfer the first sub-section of the ROIC 20 circuit pattern onto each successive area of the wafer 230 corresponding to a core circuit block 215 in the finished ROIC 20 device.

A second sub-section of the full circuit pattern of the ROIC 20 may be transferred onto the area of the wafer 230 corresponding to the peripheral circuit block 217 in the finished ROIC 20 device. The second sub-section may have a different circuit pattern than the first sub-section. The second sub-pattern may be transferred by projecting through a different reticle mask, or through a different section of the same reticle mask that is used to transfer the first sub-section of the circuit pattern. In one non-limiting example, a reticle mask may include both the first sub-section and the second sub-section of the ROIC 20 circuit pattern. The first sub-section and the second sub-section may be adjacent to one another on the reticle mask. The first sub-section and the second sub-section may be projected onto the wafer simultaneously to transfer the first sub-section of the ROIC 20 circuit pattern onto the area of the wafer corresponding to core circuit block 215-1 and the second sub-section of the ROIC 20 circuit pattern onto the adjacent area of the wafer 230 corresponding to the peripheral circuit block 217. Then, the photolithographic equipment including the reticle mask may be moved relative to the wafer along the z-axis direction, and the portion of the reticle mask including the first sub-section of the ROIC 20 circuit pattern may be projected onto the area of the wafer corresponding to core circuit block 215-2. The portion of the reticle mask including the second sub-section of the ROIC 20 circuit pattern may be covered or blocked during the exposure so as to prevent the second sub-section of the ROIC 20 from being transferred to the wafer 230. This process may be repeated to transfer the first sub-section of the ROIC 20 circuit pattern onto each successive area of the wafer corresponding to a core circuit block 215-3, 215-4 in the finished ROIC 20 device.

Accordingly, the finished ROIC 20 fabricated using a "stitching" method as described above may include a single instance of a peripheral circuit block 217, and multiple instances of an identical core circuit block 215-1, 215-2, 215-3 and 215-4 extending adjacent to one another along the z-axis. In one embodiment, the same reticle is used to sequentially expose the photoresist in each of the core circuit blocks 215-1 to 215-4. In this embodiment, each of the core circuit blocks 215-1 to 215-4 has exactly the same device layout and configuration, and there is no butted boundaries (i.e., physical gaps) between the adjacent core circuit blocks 215-1 to 215-4 in the same ROIC 20. For example, there are no physical gaps between the substrates 230 (e.g., silicon substrates) of the adjacent core circuit blocks 215-1 to 215-4 in the same ROIC 20 since all core circuit blocks 215-1 to 215-4 are located on the same continuous uninterrupted substrate 230.

FIG. 4 illustrates a pair of ROICs 20a and 20b that are butted against one another along the z-axis direction. Each of the ROICs 20a and 20b may include a monolithic semiconductor integrated circuit including a single instance of a peripheral circuit block 217, and multiple instances of an identical core circuit block 215-1, 215-2, 215-3 and 215-4 extending adjacent to one another along the z-axis without butted boundaries between them. The ROICs 20a and 20b may be identical to each other, with one ROIC 20b flipped 180° relative to the other such that peripheral edges 221 of the ROICs 20a and 20b face toward each other, and peripheral edges 222 of the ROICs 20a and 20b face away from each other. The gap 401 between the adjacent ROICs 20a and 20b may be minimized to maintain a consistent pixel pitch across the gap 401. The gap 401 extends between the respective substrates of the ROICs 20a and 20b. By butting a pair of ROICs 20a and 20b along the z-axis direction, the effective length, $L_E$, of the continuous radiation sensor area 123 along the z-axis direction (i.e., $L_E=L_{1a}+L_{1b}$ in FIG. 4) may be increased. In some embodiments, the effective length of the continuous radiation sensor area 123 of the butted ROICs 20a and 20b may be at least about 6 cm, such as 8-40 cm, including between 12-24 cm (e.g., 14-18 cm). In some embodiments, the effective length of the continuous radiation sensor area 123 may be at least about 16 cm. A detector system including butted ROICs 20a and 20b as shown in FIG. 4 and providing a continuous radiation sensor area 123 having an effective length in the z-axis direction of at least about 16 cm may be beneficial for a number of imaging applications, such as cardiac CT scanning. In the case of cardiac CT scans, for example, a larger detector length in the z-axis direction may enable the entire heart to be imaged in a single rotation about the patient (i.e., a single image slice).

Further, additional ROICs 20 may be butted against the peripheral side surfaces 219 and 220 of the ROICs 20a and 20b, which may enable the continuous radiation sensor area 123 to be extended along the x-axis direction. Thus, the three-side buttable ROICs 20a and 20b as shown in FIG. 4 may provide, in effect, a quasi-four-side-buttable design that may provide a large continuous detector area in both the x-axis and z-axis directions. Peripheral circuit blocks 217 on opposite ends of the butted ROICs 20a and 20b may provide I/O functionality for the core circuit blocks 215 of the respective ROICs 20a and 20b.

Although the embodiment shown in FIG. 4 includes a pair of ROICs 20a and 20b having an identical configuration, it will be understood that other embodiments may utilize buttable ROICs 20a and 20b that are not identical. For example, ROIC 20a may have a different number of core circuit blocks 215 than ROIC 20b.

FIG. 5 is a side view of a detector module 200 including a pair of buttable radiation detector units 100a and 100b according to an embodiment of the present disclosure. Referring to FIG. 5, each of the radiation detector units 100a and 100b may be similar to the radiation detector unit 100 described above in connection with FIGS. 2A and 2B. In particular, each of the radiation detector units 100a and 100b may include the respective ROIC 20a and 20b and a plurality of respective radiation sensors 80a and 80b directly mounted to the front side surface of the ROIC 20a and 20b. Further, the ROICs 20a and 20b of the respective radiation detector units 100a and 100b may be butted along the z-axis direction to increase the effective length of the continuous radiation sensor area along the z-axis direction as shown in FIG. 4. The radiation detector units 100a and 100b may also include bonding material portions 82 between the radiation sensors 80a and 80b and the ROICs 20a and 20b, a carrier board 125 and optional stiffening member 130, wire bonds 129 connecting the ROICs 20a and 20b to bond pad regions 126 of the carrier boards 125, electrical connectors 127 and 128 connected to the carrier boards 125, a filter assembly 131, and a conductive member 132 over the front side surfaces of the radiation sensors 80a and 80b for applying a bias voltage to the radiation sensors 80a and 80b.

The detector module 200 may also include a frame bar 90. The frame bar 90 may function as a substrate for structurally holding the radiation detector units 100a and 100b in a butted configuration as shown in FIG. 5. The front side of the frame bar 90 may include non-planar features, such as an outer lip or rim portion and a recessed flat central portion, to facilitate alignment of the radiation detector units 100a and 100b on the frame bar 90. The frame bar 90 may include a high thermal conductivity material, such as a metal. For example, the frame bar 90 may be a aluminum or copper structural element. Other suitable materials and constructions for the frame bar 90 are within the contemplated scope of disclosure. In some embodiments, the frame bar 90 may be attached to the radiation detector units 100a and 100b using a thermally conductive adhesive, such as a thermally conductive paste, and/or by mechanical connection structures (such as snap-in connectors, screws, and/or bolts and nuts).

The detector module 200 may further include a module circuit board 120. The module circuit board 200 may be electrically connected to each of the radiation detector units 100a and 100b via the electrical connectors 127 and 128. In some embodiments, the module circuit board 120 may include a detector minimodule (DMM) board (may also be referred to as a detector unit interface board) that communicates with the radiation detector units 100a and 100b of the detector module 200, and a buffer board that interfaces with a control computer 112 (see FIG. 1). The module circuit board 120 may support transmission of electrical power, control signals, and data signals between the module circuit board 120 and the radiation detector units 100a and 100b of the detector module 200, and may further support transmission of electrical power, control signals, and data signals between the module circuit board 120 and the control computer 112, other module circuit boards 120 of the detector array 300, and/or a power supply for the detector array 300.

The module circuit board 120 can include a pair of major surfaces, which can be planar surfaces on which circuit elements and interconnection traces are printed. As used herein, a major surface of a structure refers to a surface having a surface area of at least 50% of the surface area of the largest surface of the structure. In one embodiment, the major surfaces of the module circuit board 120 may extend in a direction (i.e., the y-axis direction in FIG. 5) that is perpendicular to the front side surfaces of the radiation sensors 80a and 80b of the radiation detector units 100a and 100b of the detector module 200. In some embodiments, the backside of the frame bar 90 may include non-planar features, such as a slot or recessed portion, to facilitate attachment of the module circuit board 120 to the frame bar 90 in a perpendicular orientation to the front side surfaces of the radiation sensors 80a and 80b.

Figure 6:
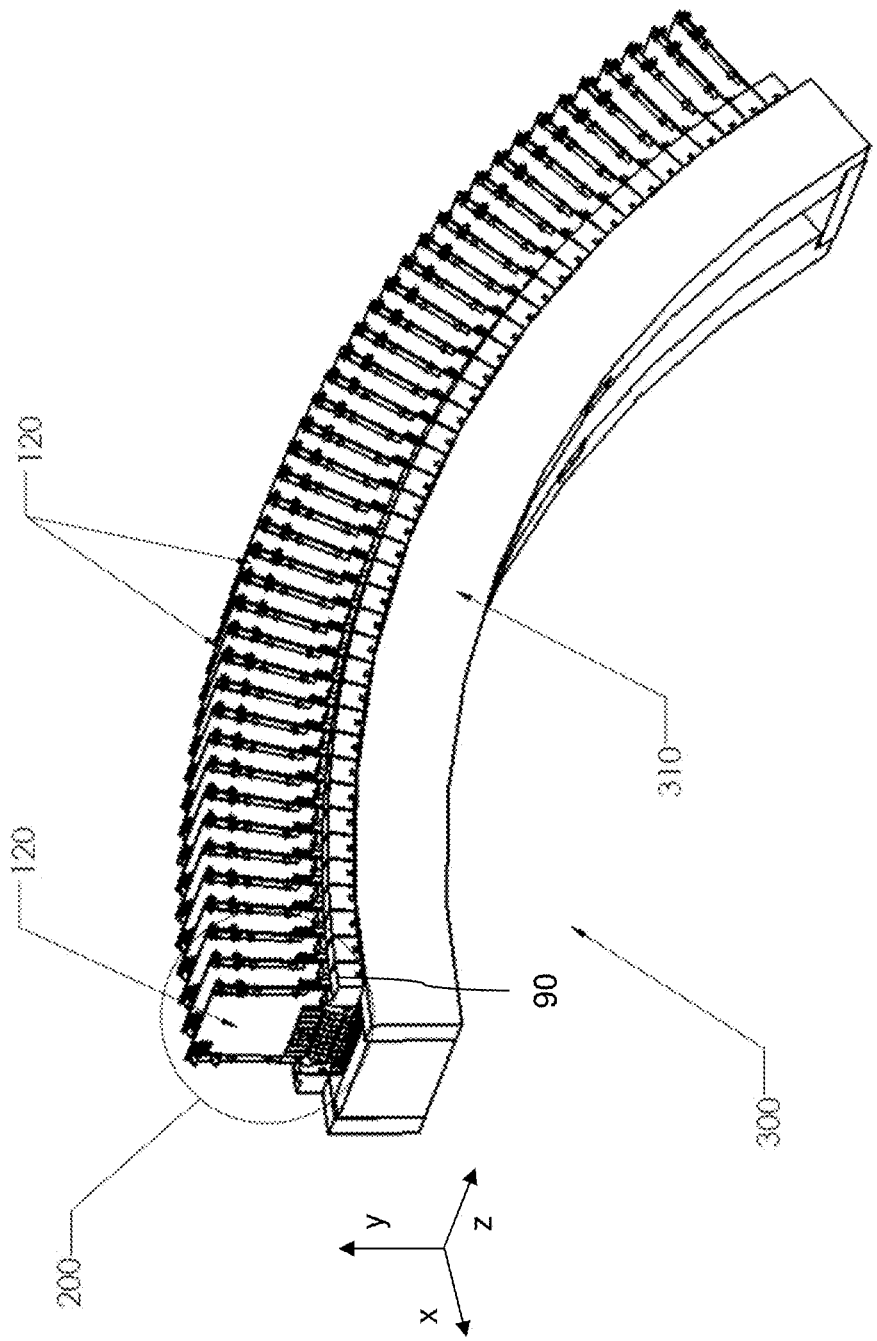
FIG. 6 is a perspective view of a detector array including multiple detector modules mounted on a detector array frame according to an embodiment of the present disclosure.

Referring to FIG. 6, the detector array 300 can be formed by assembling multiple detector modules 200 on a detector array frame 310. The detector array frame 310 may be configured to provide attachment of a row of detector modules 200 such that physically exposed surfaces of the radiation sensors 80 collectively form a curved detection surface located within a cylindrical surface. Major surfaces of the module circuit boards 120 of detector modules 200 may face each other in the detector array 300.

The detector array 300 includes an assembly of multiple detector modules 200. The multiple detector modules 200 can be assembled such that radiation sensors 80 attached to neighboring detector modules 200 abut each other, i.e., make direct surface contact with each other in the x-direction. In some embodiments, the ROICs 20 of neighboring detector modules 200 may also abut each other in the x-direction. The detector array 300 can be assembled by mounding the detector modules 200 to the detector array frame 310. In some embodiments, the detector modules 200 may be mounted to the detector array frame 310 by attaching the frame bars 90 of the detector modules 200 to the detector array frame 310 using suitable mechanical fasteners. The detector array 300 can be repaired by removing a defective detector module 200 from the detector array frame 310 without removing the functional detector modules 200 from the detector array frame 310. The removed defective detector module 200 may be replaced with a functional detector module, or one or more defective radiation detector units 100 may be replaced in the defective detector module 200 as described above to repair the module 200 followed by replacing the repaired module 200 in the detector array 300.

Generally, the radiation detector units 100 and detector modules 200 of the embodiments of the present disclosure can be constructed to provide a detector array 300 that provides two-dimensional tiling with minimal gaps. The continuous detection surface of the detector array 300 may extend at least about 6 cm, such as 8-40 cm, including between 12-24 cm (e.g., 14-18 cm) along the z-axis direction. In some embodiments, the continuous detection surface may be at least about 16 cm in the z-axis direction. In various embodiments, the radiation sensors 80 of the detector array 300 may be directly mounted to the ROIC 20 without the use of an interposer.

Figure 7A:
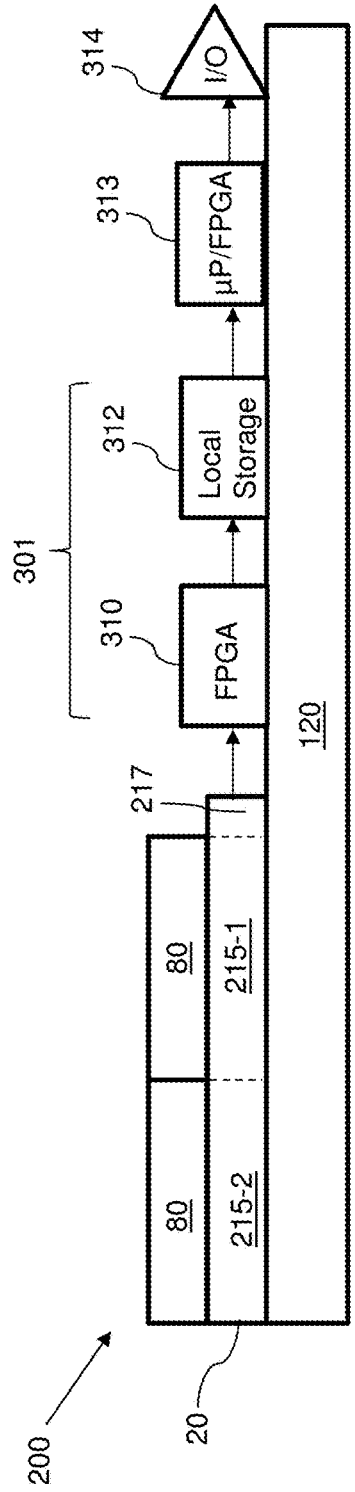
FIG. 7A is a functional block diagram of components in a detector module of a detector array according to an embodiment of the present disclosure.

FIG. 7A is a functional block diagram of components in a detector module 200 of a detector array 300 according to various embodiments. The detector module 200 may include a plurality of radiation sensors 80 electrically connected to the ROIC 20 as described above. Although a single ROIC 20 is shown in FIG. 7A, it will be understood that a detector module 200 may include two or more ROICs 20. The ROIC 20 may be configured to receive, digitize, and bin signals received from the radiation sensors 80 in order to implement a photon counting detector. For example, the ROIC 20 may be configured to receive voltage signals corresponding to a photon that has hit one of radiation sensors 80, normalize the signal, remove noise from the signal, identify an energy bin for the photon based on the received voltage, and increment the count of the corresponding energy bin. The ROIC 20 may include a peripheral circuit block 217, and a plurality of core circuit blocks 215-1 and 215-2, as described above.

The detector module 200 may further include a local control unit 301, which may include a local controller 310 and a local memory storage component 312. The local controller 310 may be a field programmable gate array (FPGA) or similar processing device that may be configured to control the operation of the ROIC 20 and the local memory storage component 312. The local memory storage component 312 may be static random access memory (SRAM), dynamic RAM (DRAM), or any other type of volatile or non-volatile memory. Various embodiments of a radiation detector system having a local control unit 301 are described in commonly-owned U.S. Pat. No. 10,396,109 to Iniewski et al., the entire contents of which are incorporated by reference herein. The local control unit 301 may be located on module circuit board 120. Alternatively, the local control unit 301 may be located in a different location on the detector module 200, such as on the carrier board 125 (see FIGS. 2A and 2B) or on the ROIC 20. The ROIC 20 may transfer photon count data to the local control unit 301 based on a certain clock rate, for example, the clock rate of the ROIC 20 and/or the local controller 310. The local memory storage component 312 may provide a buffering function for the photon count data and may be clocked at a different clock rate than the ROIC 20 and/or local controller 310. Thus, the data in the local memory storage component 312 may be read out at a rate that is independent of the clock rate of the ROIC 20 and/or the local controller 310. In various embodiments, the output rate from the local memory storage component 312 may be less than the input rate to the local memory storage component 312. This may allow may for control of the rate of output of the data from the detector module 200 to an external computer 112 (see FIG. 1) or other processing unit, and/or to an input/output (I/O) interface 314 on the detector module 200. Thus, the local control unit 301 may temporarily buffer the data from the ROIC 20, and may output the data at a rate that the I/O interface 314 and/or an additional processing unit or computer may be able to handle.

The detector module 200 may further include a local processing unit 313 that may be configured to perform pre-processing of the photon count data from the ROIC 20. The local processing unit 313 may be located downstream of the local control unit 301 in the signal chain so that photon count data may be temporarily buffered by the local control unit 301, which may output the data at a rate that is suitable for input at the local processing unit 313. Alternatively, the local processing unit 313 may be located upstream of the local control unit 301 and may receive the data at the rate it is output by the ROIC 20.

The local processing unit 313 may include a suitable processing device or devices, such as one or more microprocessors (μP) or FPGAs. The local processing unit 313 may be located on module circuit board 120. Alternatively, the local processing unit 313 may be located in a different location on the detector module 200, such as on a carrier board 125 (see FIGS. 2A and 2B) or on the ROIC 20. The local processing unit 313 may be configured to perform one or more processing operations, such as data compression of the photon count data. For example, if the amount of photon count data provided from multiple ROICs 20 through the local control unit 301 is too high for the connection 114 to adequately handle, then the local control unit 301 may buffer the photon count data and then output it at a lower rate which the connection 114 may adequately handle. Alternatively, or in addition, the local processing unit 313 may provide additional data, such as updated temperature data, updated non-conforming pixel (NCP) data, error correction, and so forth, that may be provided to the control computer 112. In some embodiments, the local processing unit 313 may include one or more machine learning engines for providing artificial intelligence (AI) applications, such as dynamic detection of bad pixels, minimodule neighbor recognition, NCP list re-configuration, and the like. In some embodiments, the local processing unit 313 may be located outside the core circuit blocks 215-1 and 215-2 of the ROIC 20, and performs data processing on the "edge" of rather than in the "core" of the detector module 200.

Data from the local control unit 301 and/or the local processing unit 313 may be provided to the I/O interface 314 of the detector module 200. The I/O interface 314 may include any wired or wireless communication interface, including Ethernet, universal serial bus (USB), fiber optics, WiFi, or co-axial cables.

Figure 7B:
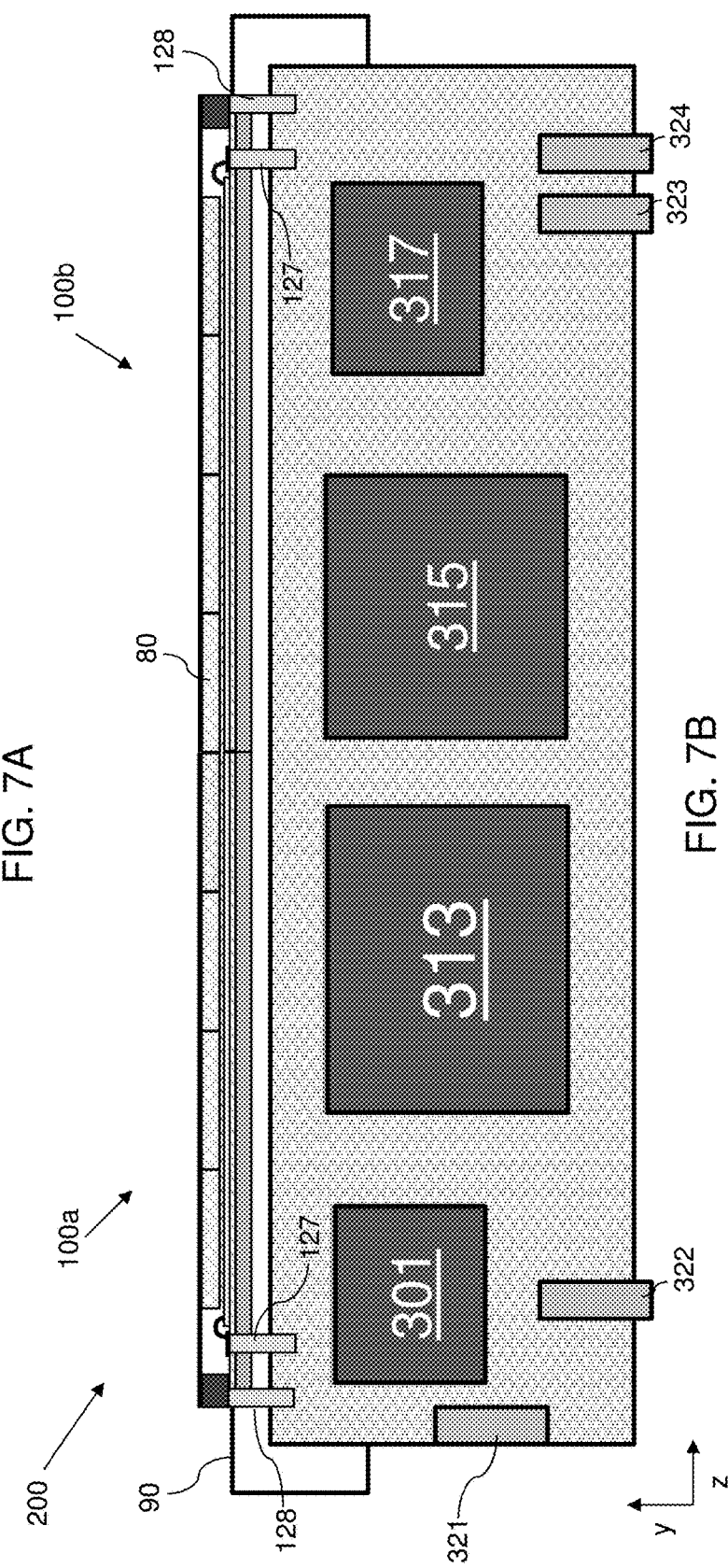
FIG. 7B is a side view of a detector module which schematically illustrates functional components of a module circuit board according to an embodiment of the present disclosure.

FIG. 7B is a side view of a detector module 200 which schematically illustrates functional components of a module circuit board 120 according to one embodiment of the present disclosure. The detector module 200 may have a similar architecture as the detector module 200 described above with reference to FIG. 5. The detector module 200 may include a pair of radiation detector units 110a and 110b each connected to a module circuit board 120 via low voltage and high voltage connectors 127 and 128, respectively. The radiation detector units 110a and 110b may be located on the front side of a frame bar 90, and the module circuit board 120 may be mounted to the backside of the frame bar 90 such that the major surfaces of the module circuit board 120 extend perpendicular to the front side surfaces of the radiation sensors 80 of the radiation detector units 110a and 110b. The module circuit board 120 may include an interface/configuration port 321, such as a JTAG port, a data input/output connector 322, a low voltage power connector 323, and a high voltage power connector 324. The module circuit board 120 may also include a low voltage power supply 315 (e.g., for providing the low voltage to the first electrical connector(s) 127), a high voltage power supply 317 (e.g., for providing the high voltage to the second electrical connector(s) 128), the local control unit 301 and the local processing unit 313.

Figure 8:
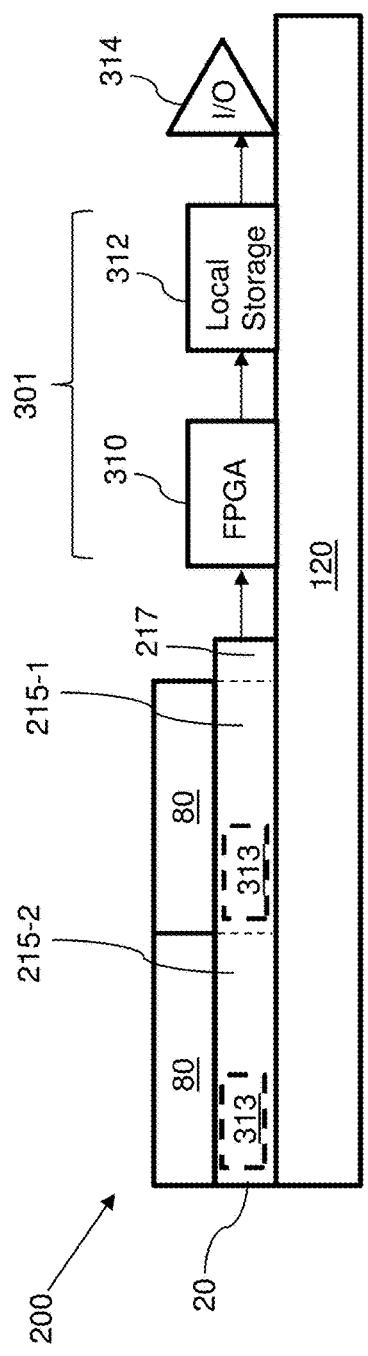
FIG. 8 is a functional block diagram of components in a detector module of a detector array according to an embodiment of the present disclosure.

FIG. 8 is a functional block diagram of components in a detector module 200 of a detector array 300 according to various embodiments. The detector module 200 of FIG. 8 is similar to the detector module 200 described above in connection with FIG. 7A. However, in the embodiment of FIG. 8, the local processing unit 313 may be located in the ROIC 20. The local processing unit 313 may include one or more processing devices, such as one or more microprocessors (µP) or FPGAs, located in the ROIC 20. In various embodiments, this may increase the complexity of the ROIC 20, but may provide the advantage of reducing the data throughput that is streamed out of the ROIC 20. Implementation of a local processing unit 313 in the ROIC 20 may involve hard wiring the processing engine of the local processing unit 313, and or using an on-chip programmable block, such as an embedded FPGA or microprocessor, in the ROIC 20. In some embodiments, the local processing unit 313 may be located in the core circuit blocks 215-1 and 215-2 of the ROIC 20. Thus, in some embodiments, such as in embodiments in which the ROIC 20 is fabricated using a "stitching" process as described above, each core circuit block 215 of the ROIC 20 may include an identical instance of the local processing unit 313.

Figure 9:
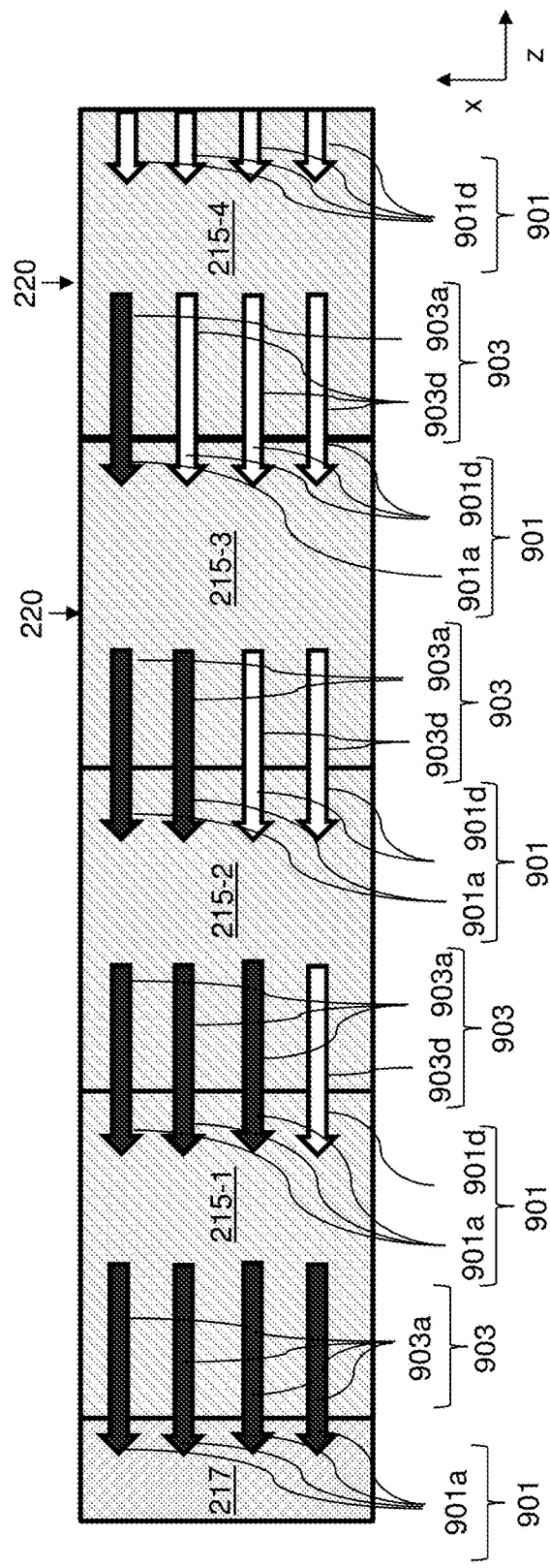
FIG. 9 is a functional block diagram of the ROIC schematically illustrating data flow within the ROIC according to an embodiment of the present disclosure.

FIG. 9 is a functional block diagram of the ROIC 20 schematically illustrating data flow within the ROIC 20. In various embodiments, the ROIC 20 may include a plurality of data buses for transmission of photon count data from and across the various functional blocks of the ROIC 20, which may include a peripheral circuit block 217, and a plurality of core circuit blocks 215-1, 215-2, 215-3 and 215-4 located adjacent to one another along the z-axis. In some embodiments, the data buses may transmit data using the low-voltage differential signaling (LVDS) standard.

In various embodiments, the core circuit blocks 215-1, 215-2, 215-3 and 215-4 of the ROIC 20 may communicate with each other in order to transmit collected photon count data to the peripheral circuit block 217 at the edge of the ROIC 20. The photon count data may be transmitted from the ROIC 20 via the peripheral circuit block 217, which includes I/O circuitry. Thus, the interior core circuit blocks 215-1, 215-2 and 215-3 require both data input from adjacent blocks capability and data output capabilities in order to receive photon count data from the core circuit block(s) located further from the peripheral circuit block 217, and to send this data, along with its own photon count data, to the next circuit block in the line. In contrast, the exterior core circuit block 215-4 located farthest from the peripheral circuit block 217 only requires data output capabilities. For the ROIC 20 having N core circuit blocks 215 (i.e., 215-1 through 215-N, where N is an integer >1), the core circuit block 215-1 located adjacent to the peripheral circuit block 217 requires N-times higher data throughput than the core circuit block, 215-N, that is located farthest from the peripheral circuit block 217.

As discussed above, in various embodiments the plurality of core circuit blocks 215-1, 215-2, 215-3 and 215-4 may be identical to one another, such as in embodiments in which the ROIC 20 is fabricated using a "stitching" process. Thus, each core circuit block 215-1, 215-2, 215-3 and 215-4 may have an identical number of input and output data channels, only some of which may be used for transmitting or receiving photon count data. This is schematically illustrated in FIG. 9, which shows input and output data channels 901 and 903, respectively, for each of the four core circuit blocks 215-1, 215-2, 215-3 and 215-4 of the ROIC 20. In general, for the ROIC 20 having N identical core circuit blocks 215, where N is an integer >1, each of the core circuit blocks 215 may have at least N−1 input data channels 901 which are configured to receive data from an adjacent block, and at least N output data channels 903.

In the exemplary embodiment shown in FIG. 9, active data channels (e.g., data buses) 901a and 903a that are used for transmitting or receiving photon count data are indicated in black, while dummy data channels 901d and 903d which are not used for transmitting or receiving photon count data are indicated in white. As shown in FIG. 9, in core circuit block 215-4, which is located furthest from the peripheral circuit block 217, all input data channels 901 are dummy data input channels 901d and none of the input data channels 901 are active data channels 901a used to receive photon count data. Furthermore, only one of the four output data channels 903 is an active data output channel 903a used to transmit photon count data to the adjacent circuit block 215-3, while the three remaining data output channels 903 are dummy data output channels 903d.

In core circuit block 215-3, one input data channel 901 is the active input data channel 901a which receives photon count data from core circuit block 215-4 via the active data output channel 903a of block 215-4, while the remaining input data channels 901 are dummy data input channels 901d. Furthermore, two of the data output channels 903 are dummy data output channels 903d and the other two are active data output channels 903a which are used to transmit photon count data from core circuit blocks 215-4 and 215-3, respectively, to core circuit block 215-2.

In core circuit block 215-2, two active input data channels 901a receive photon count data from core circuit blocks 215-4 and 215-3 via channels 903a of block 215-3, respectively, and three output data channels 903a are used to transmit photon count data from core circuit blocks 215-4, 215-3, and 215-2, respectively, to core circuit block 215-1. The remaining channels are dummy input and output channels.

In core circuit block 215-1, three active input data channels 901a receive photon count data from core circuit blocks 215-4, 215-3, and 215-2 via channels 903a of block 215-2, respectively, and all four active output data channels 903a are used to transmit photon count data from core circuit blocks 215-4, 215-3, 215-2, and 215-1, respectively, to the peripheral circuit block 217. There is one dummy input data channel 901d and no dummy output data channels 903d in block 215-1.

The peripheral circuit block 217 may include four active input data channels 901a which receive photon count data from core circuit blocks 215-4, 215-3, 215-2, and 215-1 via the respective channels 903a of block 215-1, respectively.

In one embodiment, the radiation detector unit 200 comprises a read-out integrated circuit (ROIC) 20 comprising identical first, second and third core circuit blocks (e.g., 215-4, 215-3 and 215-3) located adjacent to one another along a first direction (e.g., the z-direction) and containing an identical number and layout of input data channels 901 and output data channels 903. First, second and third radiation sensors 90 are bonded to the first, second and third second core circuit blocks respectively. The method of operating the radiation detector unit 200 comprises generating first photon count data in the first core circuit block 215-4 based on X-ray photons received by the first radiation sensor 80. The method also includes transmitting the first photon count data from the first core circuit block 215-4 to the second core circuit block 215-2 via a first active output data channel 903a of the output data channels 903 of the first core circuit block 215-4, while at least one first dummy output data channel 903d of the output data channels 903 of the first core circuit block 215-4 does not transmit photon count data to the second circuit block 215-3. The method also includes generating second photon count data in the second core circuit block 215-3 based on X-ray photons received by the second radiation sensor 80. The method also includes transmitting the first and the second photon count data from the second core circuit block 215-3 to the third core circuit block 215-2 via respective first and second active output data channels 903a of the output data channels 903 of the second core circuit block 215-3, while at least one second dummy output data channel 903d of the output data channels 903 of the second core circuit block 215-3 does not transmit photon count data to the third circuit block 215-2.

In one embodiment, the first dummy output data channel 903d of the first core circuit block 215-4 is located in a first location in the first core circuit block 215-4. The second active output data channel 903a of the second core circuit block 215-3 is located in a first location of the second core circuit block 215-3. The first location in the first core circuit block 215-4 corresponds the first location in the second core circuit block 215-3. For example, referring to FIG. 9, the first dummy output data channel 903d of the first core circuit block 215-4 may comprise the second bus from the edge 220 of the first core circuit block 215-4 and the second active output data channel 903a of the second core circuit block 215-3 may also comprise the second bus from the same edge 220 of the second core circuit block 215-3.

In some embodiments, the unused dummy data channels 901d, 903d in the core circuit blocks 215 of the ROIC 20 may be powered down. In some embodiments, a system controller may manage the usage of the dummy data channels 901d, 903d such that "dummy signals" which are not related to the photon count data detected by the radiation sensors 80 may be provided in some or all of the dummy data channels 901d, 903d. This may help to maintain a uniform temperature profile across the ROIC 20, as providing dummy signals may cause the dummy data channels 901, 903 to act as a heater (i.e., a resistive heater due to current flowing through the dummy data channels (i.e., conductive buses)).

Figure 10:
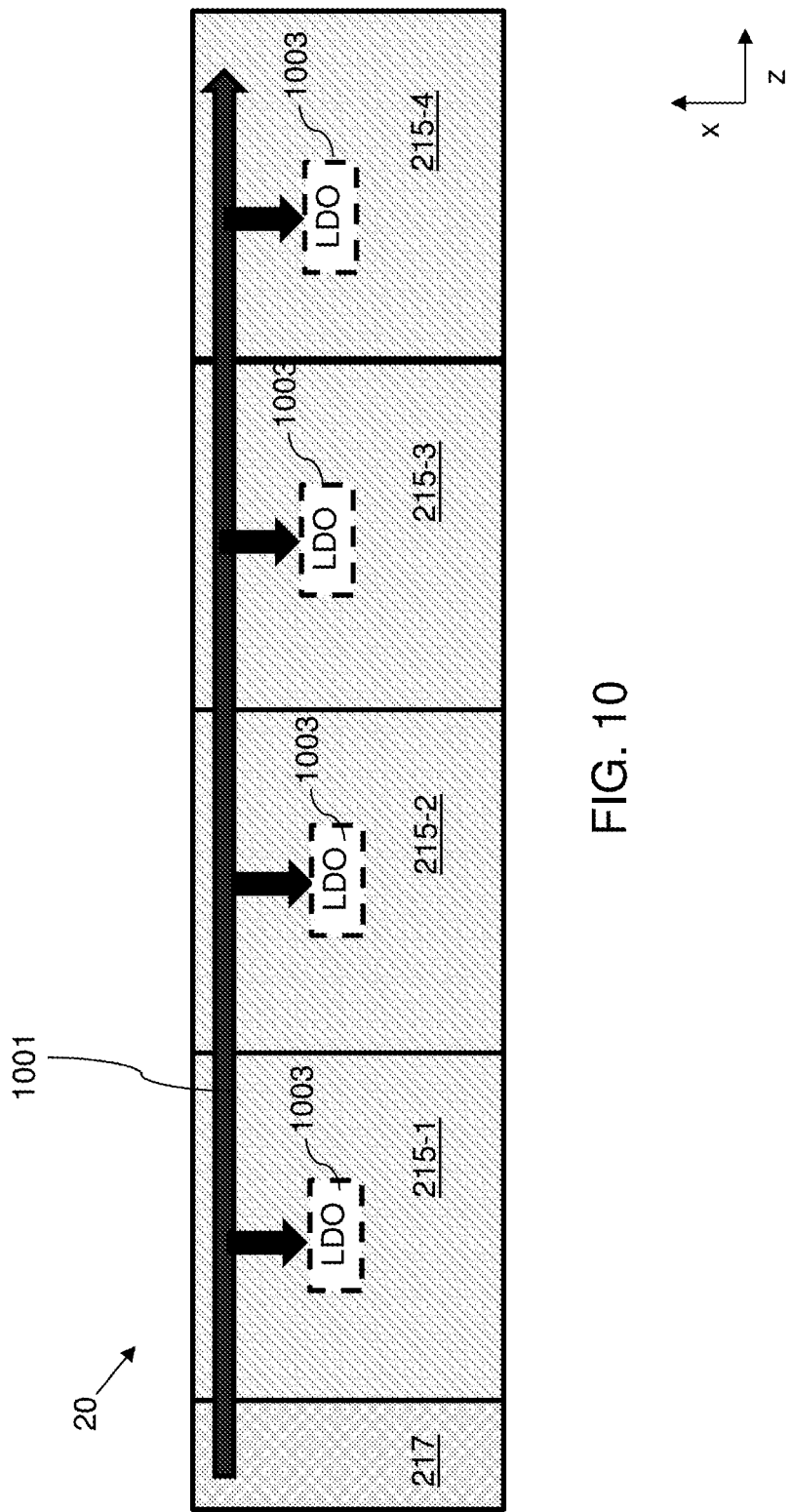
FIG. 10 is a functional block diagram of the ROIC schematically illustrating power management within the ROIC according to an embodiment of the present disclosure.

FIG. 10 is a functional block diagram of the ROIC 20 schematically illustrating power management within the ROIC 20. In various embodiments, the ROIC 20 may include a power bus 1001 for providing power to the various functional blocks of the ROIC 20, which may include a peripheral circuit block 217, and a plurality of core circuit blocks 215-1, 215-2, 215-3 and 215-4 located adjacent to one another along the z-axis. Electrical power, which may be at a predetermined power supply voltage (e.g., Vdd), may be provided at the peripheral circuit block 217 and transmitted via the power bus 1001 to each of the successive core circuit blocks 215-1, 215-2, 215-3 and 215-4. However, due to the inherent IR drop as the power moves along the power bus 1001, the supply voltage received at core circuit blocks 215 further away from the peripheral circuit block 217 may be lower than the supply voltage received at core circuit blocks 215 closer to the peripheral circuit bock 217. In some embodiments, each of the core circuit blocks 215-1, 215-2, 215-3 and 215-4 may include a low dropout regulator (LDO) 1003 electrically coupled to the power bus 1001. The LDOs 1003 may be configured to output a power supply with an identical internal supply voltage within each of the core circuit blocks 215-1, 215-2, 215-3 and 215-4 to address the issue of non-uniform voltage along the length of the power bus 1001.

FIG. 11A schematically illustrates a radiation sensor 80 according to various embodiments of the present disclosure. Each radiation sensor 80 of a radiation detector unit 100, detector module 200, and/or detector array 300 may include a pixel sensor array including a plurality of individual pixel sensors 401. In various embodiments, a radiation sensor 80, such as shown in FIG. 11A, may be directly mounted to a respective core circuit block 215 of a ROIC 20 such that event detection signals from pixel sensors 401 of the radiation sensor may be transmitted to respective pixel input channels of the core circuit block 215 of the ROIC 20 via a bonding material portion 82 as described above.

In some embodiments, each radiation sensor 80 may include a semiconductor material having first and second major surfaces, and at least one anode electrode and at least one cathode electrode over the first and second major surfaces of the semiconductor material. The semiconductor material may comprise any suitable semiconductor material for detecting ionizing radiation, such as X-ray and/or gamma ray radiation, that is disposed between the at least one anode electrode and the at least one cathode electrode. In various embodiments, the semiconductor material of the radiation sensor 80 may include a II-VI semiconductor material, such as cadmium telluride, cadmium zinc telluride (i.e., CdZnTe or "CZT"), cadmium selenide telluride, or cadmium zinc selenide telluride. Other suitable semiconductor materials, are within the contemplated scope of disclosure.

In some embodiments, the radiation sensor 80 may include a plurality of anode electrodes (e.g., one anode electrode per pixel sensor 401) over a first major surface of the semiconductor material, and a common cathode electrode over a second major surface of the semiconductor material. In an assembled radiation detector unit 100, the surface of the radiation sensor 80 including the anode electrodes may face the front side surface of the ROIC 20, and the surface of the radiation sensor 80 including the cathode electrode may face toward the radiation (e.g., X-ray) source. In some embodiments, an anti-scatter grid (ASG) (not shown in FIG. 11A) may be aligned over the radiation sensor 80 such that openings in the ASG correspond to the locations of pixel sensors 401 of the radiation sensor 80. Each opening through the ASG may correspond to the location of an individual pixel sensor 401, or may encompass a plurality of pixel sensors 401 (e.g., an N×M region of pixel sensors 401), which may also be referred to as a "macro-pixel."

In many radiation sensors 80 used in imaging applications, such as in X-ray CT imaging systems, the shapes of the individual pixel sensors 401 are square. However, as the width of the detector surface of the detector array 300 is increased in the z-axis direction, the number of pixel sensors per radiation detector unit 100 and detector module 200 may become quite large. For example, with an N×M array of square pixels having a pixel pitch of 330 μm, nearly 500 pixels are needed to provide 16 cm of coverage across the z-axis direction. In addition, assuming each detector module 200 includes 32 rows of pixels along the other (i.e., x-axis) direction, the total number of pixel sensors 401 per detector module 200 may be in excess of 15,000. This may create power dissipation problems for the ROICs 20 to which the radiation sensors 80 are mounted. One solution to this problem is to increase the size of each pixel sensor 401. However, increasing the pixel size increases the number of photon counts per pixel, which can lead to an undesirable increase in pile-up effects.

Various embodiments include a radiation sensor 80 including an array of pixel sensors 401, where each pixel sensor 401 of the array may have a larger length dimension in a first direction (i.e., the z-axis direction) than the length dimension in a second direction that is perpendicular to the first direction (i.e., the x-axis direction). This is illustrated in FIG. 11B, which is an enlargement of a portion of the radiation sensor 80 of FIG. 11A showing an individual pixel sensor (i.e., one pixel) 401 according to an embodiment of the present disclosure. As shown in FIG. 11B, the dimension of the pixel sensor 401 in the z-axis direction, $d_1$, is larger than the dimension of the pixel sensor 401 in the x-axis direction, $d_2$. Thus, the pixel sensors 401 may have a rectangular shape. In various embodiments, $d_1$ may be at least about 25% larger, such as 25-80% larger (e.g., 30-50% larger), than $d_2$. This may reduce the power dissipation of the ROICs 20 while avoiding excessive pile-up effects.

Figure 11C:
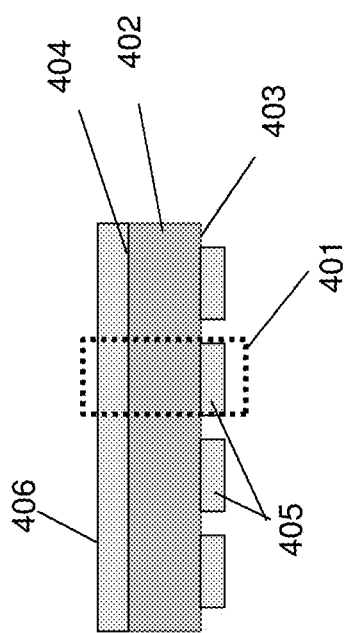
FIG. 11C schematically illustrates a side cross-sectional view of a portion of the radiation sensor along plane C-C' in FIG. 11A according to an embodiment of the present disclosure.

Thus, in one embodiment shown in FIG. 11C, a radiation sensor 80 comprises a semiconductor material (e.g., a semiconductor substrate tile) 402 having a first major surface 403 and an opposing second major surface 404. A plurality of anode electrodes 405 are located on the first major surface 403. A cathode electrode 406 is located on the second major surface 404. A respective area of the semiconductor material 402 below each of the anode electrodes 405 comprises the pixel sensor 401. A dimension of each of the pixel sensors 401 in a first direction (e.g., z-direction) in a plane of the first major surface 403 is at least 25% larger than a dimension in a perpendicular second direction (e.g., x-direction) in the plane of the first major surface 403, as shown in FIG. 11B.

In one embodiment, the semiconductor material 402 may comprises cadmium zinc telluride, each of the pixel sensors 401 has a rectangular shape as shown in FIG. 11A, and the dimension in first direction along one sidewalls of the rectangular shape is 25 to 80% larger than the dimension in the second direction along a perpendicular sidewall of the rectangular shape of each pixel sensor 401, as shown in FIG. 11B.

Referring to all drawings of the present disclosure and according to an aspect of the present disclosure, a computed tomography system is provided. The computed tomography system comprises: the radiation source 104 configured to emit an X-ray, the detector array 300 configured to receive the X-ray from the radiation source 104 through an intervening space configured to contain an object 110 therein (e.g., through the support 108), and an image reconstruction system including a computer 112 configured to run an automated image reconstruction algorithm on detection signals generated from the detector array 300, which can be employed as the detector array 300 in the system of FIG. 1.

The devices of the embodiments of the present disclosure can be employed in various radiation detection systems including computed tomography (CT) imaging systems. Any direct conversion radiation sensors may be employed such as radiation sensors employing Si, Ge, GaAs, CdTe, CdZnTe, and/or other similar semiconductor materials. The radiation sensors 80 of the present disclosure are buttable on all four sides, and provides on-pitch radiation detection grid over a large detection area.

The radiation detectors of the present embodiments may used for medical imaging, such as in Low-Flux applications in Nuclear Medicine (NM), whether by Single Photon Emission Computed Tomography (SPECT) or by Positron Emission Tomography (PET), or as radiation detectors in High-Flux applications as in X-ray Computed Tomography (CT) for medical applications, and for non-medical imaging applications, such as in baggage security scanning and industrial inspection applications.

While the disclosure has been described in terms of specific embodiments, it is evident in view of the foregoing description that numerous alternatives, modifications and variations will be apparent to those skilled in the art. Each of the embodiments described herein can be implemented individually or in combination with any other embodiment unless expressly stated otherwise or clearly incompatible. Accordingly, the disclosure is intended to encompass all such alternatives, modifications and variations which fall within the scope and spirit of the disclosure and the following claims.

The invention claimed is:

1. A radiation detector unit, comprising:
   a read-out integrated circuit (ROIC) comprising a plurality of core circuit blocks located on a continuous uninterrupted substrate adjacent to one another along a first direction; and
   a plurality of radiation sensors bonded to a front side surface of the ROIC, wherein each radiation sensor of the plurality of radiation sensors is bonded to a respective core circuit block of the plurality of core circuit blocks of the ROIC,
   wherein the radiation sensors are directly bonded to the front side surface of the ROIC such that no interposer is used to route event detection signals from the radiation sensors to the core circuit blocks of the ROIC, and
   the ROIC further comprises a power bus that extends from a peripheral circuit block to each of the core circuit blocks along the first direction, and wherein each of the core circuit blocks comprises a low dropout regulator configured to provide an identical supply voltage to each of the core circuit blocks.

2. The radiation detector unit of claim 1, wherein the peripheral circuit block is located on the continuous uninterrupted substrate of the ROIC adjacent to the plurality of core circuit blocks along the first direction.

3. The radiation detector unit of claim 2, wherein each core circuit block of the ROIC is configured to receive event detection signals from a radiation sensor and convert the event detection signals to digital detection signals.

4. The radiation detector unit of claim 3, wherein the ROIC further comprises a local processing unit configured to perform operations comprising at least one of:
   data compression or buffering of the digital detection signals generated by the core circuit blocks;
   providing updated temperature data;
   providing updated non-conforming pixel data;
   error correction;
   dynamic detection of bad pixels;

minimodule neighbor recognition; or non-conforming pixel list re-configuration.

5. The radiation detector unit of claim 2, wherein:

the peripheral circuit block is located adjacent to a first peripheral edge of the ROIC; and the plurality of core circuit blocks comprise N instances of an identical core circuit block extending adjacent to one another along the first direction to a second peripheral edge of the ROIC that is opposite the first peripheral edge of the ROIC, where N is an integer >1.

6. The radiation detector unit of claim 5, wherein each core circuit block includes at least N output data channels for transmitting digital detection signals to the adjacent circuit block that is more proximate to the first peripheral edge of the ROIC, and at least N−1 input data channels for receiving digital detection signals from the adjacent circuit block that is more proximate to the second peripheral edge of the ROIC.

7. The radiation detector unit of claim 2, further comprising a carrier board, wherein the ROIC is located over the front side surface of the carrier board, the carrier board comprises a bond pad region on the front side surface of the carrier board, and a plurality of wire bonds electrically connect bond pads on the peripheral circuit block of the ROIC to bond pads of the bond pad region of the ROIC.

8. The radiation detector unit of claim 1, wherein:

the continuous uninterrupted substrate does not contain gaps between the adjacent core circuit blocks; and the adjacent core circuit blocks are formed by photolithographic stitching on the continuous uninterrupted substrate and do not contain a gap between them.

9. A detector module, comprising:

the radiation detector unit of claim 4;

a second radiation detector unit, comprising:

a second read-out integrated circuit (ROIC) comprising a plurality of core circuit blocks adjacent to one another along the first direction; and a second plurality of radiation sensors bonded to a front side surface of the second ROIC, wherein each radiation sensor of the second plurality of radiation sensors is bonded to a respective core circuit block of the plurality of core circuit blocks of the second ROIC; and a support member, wherein the radiation detector unit and the second radiation detector unit are arranged on the support member such that a first peripheral edge of the radiation detector unit abuts a first peripheral edge of the second radiation detector unit along the first direction and the plurality of radiation sensors and the second plurality of radiation sensors form a continuous detector surface having a length of at least 8 cm along the first direction.

10. The detector module of claim 9, wherein:

the plurality of radiation sensors and the second plurality of radiation sensors form a continuous detector surface having a length of at least 16 cm along the first direction;

the plurality of core circuit blocks of the second ROIC are located on a second continuous uninterrupted substrate adjacent to one another along the first direction, the second continuous uninterrupted substrate does not contain gaps between the adjacent core circuit blocks of the second ROIC, and the adjacent core circuit blocks of the second ROIC are formed by photolithographic stitching on the second continuous uninterrupted substrate and do not contain a gap between them; and a gap extends between the continuous uninterrupted substrate and the second continuous uninterrupted substrate, and between the plurality of core circuit blocks of the ROIC and the plurality of core circuit blocks of the second ROIC.

11. The radiation detector unit of claim 1, wherein length and width dimensions of each of the core circuit blocks is substantially equal to the length and width dimensions of the radiation sensors bonded to the respective core circuit blocks.

12. The radiation detector unit of claim 11, wherein the combined length dimension of the plurality of core circuit blocks along the first direction is between 4 cm and 20 cm.

13. The radiation detector unit of claim 12, wherein the combined length dimension of the plurality of core circuit blocks along the first direction is 8 cm to 16 cm.

14. The radiation detector unit of claim 1, wherein each of the radiation sensors comprises an array of pixel sensors, wherein each pixel sensor of the array of pixel sensors has a dimension in the first direction that is 25-80% larger than the dimension of the pixel sensor in a second direction that is perpendicular to the first direction.

15. A detector module, comprising:

the radiation detector unit of claim 1; and a module circuit board electrically coupled to the radiation detector unit.

16. The detector module of claim 15, further comprising a support member which comprises a frame bar having a front side surface and a backside surface, wherein the radiation detector unit is mounted to the front side surface of the frame bar, and the module circuit board is attached to the frame bar such that first and second major surfaces of the module circuit board extend away from the backside surface of the frame bar along a direction that is perpendicular to a top surface of the continuous uninterrupted substrate which supports the ROIC.

17. A detector array, comprising:

a detector array frame; and a plurality of detector modules of claim 15 mounted to the detector array frame such that the radiation detector units of the plurality of detector modules abut one another along a second direction that is perpendicular to the first direction.

18. A computed tomography system comprising:

an X-ray radiation source configured to emit an X-ray;

the detector array of claim 17, wherein the detector array is configured to receive the X-ray from the X-ray radiation source through an intervening space configured to contain an object therein; and an image reconstruction system including a computer configured to run an automated image reconstruction algorithm on detection signals generated from the detector array.

* * * * *